US012809597B2

(12) United States Patent
Wang et al.

(10) Patent No.: US 12,809,597 B2
(45) Date of Patent: Nov. 24, 2026

(54) INTEGRATING FEATURES INTO LARGE CODE BASES AUTOMATICALLY USING GENERATIVE ARTIFICIAL INTELLIGENCE MODELS

(71) Applicant: Microsoft Technology Licensing, LLC, Redmond, WA (US)

(72) Inventors: Xiaowen Wang, Redmond, WA (US); Corneliu Iulian Lupu, Sammamish, WA (US); Chitti Babu Pacharu, Redmond, WA (US); Lei Zhang, Kirkland, WA (US); Xiangcheng Yu, Woodinville, WA (US); Anupma Sharan, Bellevue, WA (US); Zhengyi Chen, Jersey City, NJ (US); Rhonda J. South, Seattle, WA (US); Bhagyashree Mahesh Kulkarni, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 249 days.

(21) Appl. No.: 18/680,936

(22) Filed: May 31, 2024

(65) Prior Publication Data

US 2025/0370726 A1 Dec. 4, 2025

(51) Int. Cl.
*G06F 8/30* (2018.01)
*G06F 8/35* (2018.01)
*G06F 8/71* (2018.01)

(52) U.S. Cl.
CPC .................................... *G06F 8/35* (2013.01)

(58) Field of Classification Search
None
See application file for complete search history.

(56) References Cited

U.S. PATENT DOCUMENTS 11,494,285 B1 * 11/2022 Manthey ............. G06F 11/3604
2021/0026605 A1 * 1/2021 Evangelopoulos ....... G06F 8/33
(Continued)

FOREIGN PATENT DOCUMENTS

CN 116306672 A 6/2023
WO WO-2024103764 A1 * 5/2024 ............... G06F 8/36

OTHER PUBLICATIONS

Extended European Search Report received for EP Application No. 25177553.2, mailed on Sep. 25, 2025, 14 pages.
(Continued)

*Primary Examiner* — Philip Wang
(74) *Attorney, Agent, or Firm* — Ray Quinney & Nebeker P.C.

(57) ABSTRACT

This disclosure describes a codebase integration system that provides a multi-step framework for automatically integrating features into a codebase using generative artificial intelligence (AI) models. For example, the codebase integration system utilizes one or more generative AI models in different iterative steps to automatically integrate or modify features in codebases based on user queries. By intelligently separating the overall process of automatic codebase feature integration into a multi-step process, the codebase integration system can utilize one or more generative AI models to more efficiently and accurately produce results at each step. Additionally, the iterative processes further leverage the one or more generative AI models in a way that quickly and efficiently achieves accurate results at various steps.

20 Claims, 12 Drawing Sheets

(56) References Cited

U.S. PATENT DOCUMENTS

| | | | | |
|---|---|---|---|---|
| 2024/0296315 | A1* | 9/2024 | Singh | G06F 16/3325 |
| 2025/0013438 | A1* | 1/2025 | Goodman | G06F 8/35 |
| 2025/0138502 | A1* | 5/2025 | Patel | G06F 8/33 |
| 2025/0244960 | A1* | 7/2025 | Arora | G06F 8/30 |
| 2026/0064377 | A1* | 3/2026 | Filev | G06F 11/362 |

OTHER PUBLICATIONS

Communication pursuant to Article 94(3) received for European Application No. 25177553.2, mailed on Aug. 5, 2026, 10 Pages.

* cited by examiner

INTEGRATING FEATURES INTO LARGE CODE BASES AUTOMATICALLY USING GENERATIVE ARTIFICIAL INTELLIGENCE MODELS

BACKGROUND

A codebase refers to a collective body of source code associated with one or more software projects. Typically, codebases are extensive repositories that include files, directories, functions, classes, and other artifacts that form applications or systems. As hardware capabilities advance and more tasks integrate computers and software solutions, codebases continue to grow in size and complexity. Consequently, managing, modifying, and editing codebases becomes increasingly challenging. For example, when needing to implement a change, such as adding new features, many existing systems struggle to efficiently locate and implement the new feature in multiple files across the codebase. Furthermore, the growing size and complexity of codebases often cause inconsistent and inaccurate modifications. In some instances, these changes break previously functional features. These problems escalate as codebases continue to scale in size.

BRIEF DESCRIPTION OF THE DRAWINGS

The following detailed description provides specific and detailed implementations accompanied by drawings. Additionally, each of the figures listed below corresponds to one or more implementations discussed in this disclosure.

DETAILED DESCRIPTION

Figure 1:
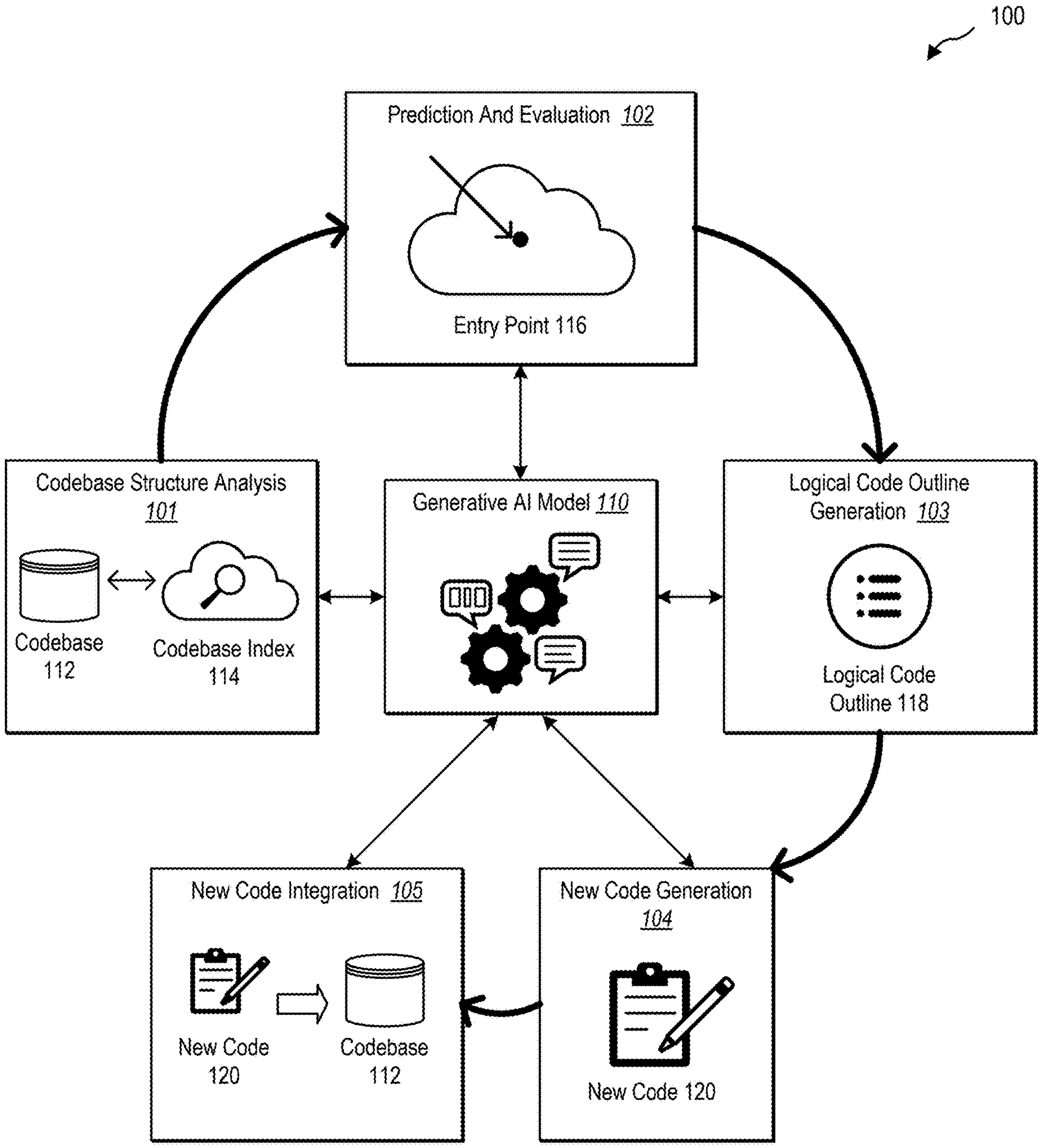
FIG. 1 illustrates an example overview of a codebase integration system configured to automatically integrate features into a codebase using generative artificial intelligence (AI) models based on a user query.

This disclosure describes a codebase integration system that provides a multi-step framework for automatically integrating features into a codebase using generative artificial intelligence (AI) models. For example, the codebase integration system utilizes one or more generative AI models in different iterative steps to automatically integrate or modify features in codebases based on user queries. By intelligently separating the overall process of automatic codebase feature integration into a multi-step process, the codebase integration system can utilize one or more generative AI models to more efficiently and accurately produce results at each step. Additionally, the iterative processes further leverage the one or more generative AI models in a way that quickly and efficiently achieves accurate results at various steps.

Implementations of the present disclosure provide benefits and solve problems in the art with systems, computer-readable media, and computer-implemented methods by using a codebase integration system to automatically integrate features into a large codebase using one or more generative AI models and multiple iterative processes. In particular, the codebase integration system improves the efficiency, accuracy, and flexibility of computing systems and devices by enabling the automatic integration of features requested in user queries into large and complex codebases through the intelligent use of generative AI models.

To elaborate, in various implementations, based on receiving a user query requesting to integrate a feature into the codebase, the codebase integration system identifies a codebase index for the codebase. Using the codebase index, the codebase integration system determines an entry point in the codebase for the feature based on providing a first codebase query prompt to one or more generative AI models and a second evaluation prompt to the one or more generative AI models in a first iterative process. Upon determining the entry point, the codebase integration system generates a logical code outline for integrating the feature into the codebase based on providing a second codebase query prompt to the one or more generative AI models and a second evaluation prompt to the one or more generative AI models in a second iterative process. Upon generating the logical code outline, the codebase integration system generates new feature code (also referred to as "new code") for integrating the feature into the codebase based on providing a third codebase query prompt to the one or more generative AI models and a third evaluation prompt to the one or more generative AI models in a third iterative process. Upon generating the new code, the codebase integration system integrates the new code into the codebase at the entry point.

As described in this disclosure, the codebase integration system delivers several significant technical benefits in terms of improved efficiency, accuracy, and flexibility compared to existing systems. Moreover, the codebase integration system provides several practical applications that address problems related to accurately and efficiently integrating new features indicated in a user query into a large codebase automatically using one or more generative AI models and iterative processes.

To illustrate, when adding new features to a codebase, many existing systems require manually inserting the new features, which often includes performing several codebase search queries and excessively navigating through folders and files of the codebase to identify the files that need to be changed to add or modify the feature. Once all the files are found, many existing systems require users to manually create and insert consistent, error-free code into the relevant portion of each file, properly invoking resources and functions to include the feature. However, users often make mistakes and need to repeat many of their actions. Together, these actions require significant computational resources to search, navigate, modify, test, and correct the codebase when trying to implement new features.

In contrast, the codebase integration system improves efficiency and accuracy by utilizing a multi-step framework that optimizes generative AI model usage and reduces the number of queries to integrate new features into a codebase. For example, in many of the steps in the framework, the codebase integration system provides instructions to one or more generative AI models to generate, evaluate, iterate, and refine a particular, accurate output. The codebase integration system then uses the output in the next step, which uses a similar iterative process, to generate another particular output. In this way, the codebase integration system accurately and efficiently responds to a feature request in a user query by correctly locating where to implement the feature across the codebase, determining the resources needed to create the feature, accurately generating new feature code for the feature at each location, and correctly integrating the new feature into the codebase. Indeed, the codebase integration system utilizes self-improving predictive loops to refine the integration process over time for better accuracy.

Various implementations of the codebase integration system enable additional benefits. To illustrate, the codebase integration system can provide multi-file integration, where the codebase integration system efficiently identifies and adds complex features across multiple files of a codebase, enhancing the overall functionality of the codebase. In addition, in many instances, the codebase integration system utilizes pre-trained generative models that do not require training. Rather, within the iterative process, the codebase integration system utilizes in-context learning and/or reinforcement learning to improve codebase queries and retrieve data from the codebase, enabling flexibility and additional customization without expending significant computational resources on training and retraining large machine learning models.

To illustrate, in each step that includes an iterative process, the codebase integration system utilizes a generative AI model to learn from inputs (e.g., the user query, entry points, and logical code outlines), evaluate the results of its actions (e.g., the codebase index, logical code outlines, and generated code), and iterate the process if necessary (e.g., generating new search queries and evaluating new results). Furthermore, as mentioned above, because of how the codebase integration system implements the multi-step framework, at the end of each iterative step, the generative AI models essentially forget any specifics from that step and move to the next with a clean memory. In this way, the codebase integration system prevents the generative AI models from carrying over any detailed information from one step to another and causes the generative AI models to focus on the new task at hand, using only the relevant outputs from the previous steps. This also helps the generative AI models better handle the complexity of each step independently and prevents any unnecessary compounding of information, ensuring an improved, accurate, streamlined, and efficient code generation process.

As another example, the codebase integration system can automatically integrate codebase features consistently across the codebase. For instance, the codebase integration system identifies and adheres to existing coding patterns and syntax structures, ensuring that the newly integrated code fits seamlessly with the existing code. Indeed, by adhering to existing design patterns and coding styles, the codebase integration system can maintain high standards of code quality and reduce the risk of introducing errors, which results in a more stable and reliable codebase. Similarly, the codebase integration system provides unified updates, where all relevant files in the codebase are updated simultaneously, preventing inconsistencies that can occur with piecemeal edits.

Furthermore, the codebase integration system provides flexible scalability. For example, the multi-step framework provided by the codebase integration system is easily scalable to handle large, complex codebases, which is beneficial in large codebase settings. In some instances, the codebase integration system improves user efficiency and productivity. For instance, by automating the integration of features across multiple files in large codebases, the codebase integration system significantly reduces the time and effort required by development teams to integrate features into a codebase.

As illustrated in the discussion above, this disclosure uses a variety of terms to describe the features and advantages of one or more described implementations. For example, this disclosure describes the codebase integration system in the context of a cloud computing system. As an example, the term "cloud computing system" refers to a network of interconnected computing devices that provide various services and applications to computing devices (e.g., server devices and client devices) inside or outside of the cloud computing system.

The terms "software codebase" or "codebase" refer to a collective body of source code associated with one or more software projects. Typically, codebases are extensive repositories that include files, directories, functions, classes, and other artifacts that form applications or systems.

The term "codebase index" refers to a data structure that provides the structure, organization, dependencies, and/or design patterns of a codebase. A codebase index provides a blueprint of a codebase's architecture. In some instances, a codebase index includes a structure analysis of a codebase, including how elements such as classes, functions, definitions, and references interact with each other and which parameters are needed for each. In some instances, a codebase index includes code summaries and logical explanations regarding a codebase, including a description of codebase functionality.

The term "user query" refers to data received from a user or a system for adding or modifying a feature in a codebase. The term "codebase search query" (or simply "query") refers to a codebase or database-type query for searching the codebase for criteria included in the query. In this document, "user query" and "query" refer to these different types of queries.

As an example, the term "AI model" refers to an artificial intelligence computational system that learns from data and makes predictions or decisions. AI models are commonly trained using algorithms to autonomously process input data to achieve specific tasks, such as image recognition or natural language understanding. AI models serve as the core component within AI workflows, enabling efficient and intelligent processing of tasks on client devices (or cloud platforms in some instances). AI models can include heuristic models, machine-learning models, and/or neural networks. In some implementations, an AI workflow includes a small generative model (SGM). In some instances, an AI model is implemented by the operating system. In various instances, an AI model is implemented by a third-party application or service included on a client device.

The term "generative AI model" refers to a large or small artificial intelligence system that utilizes deep learning and a large number of parameters (e.g., in the billions or trillions for a large version and fewer for a small version) that are trained on one or more extensive datasets to produce coherent, contextually relevant, and fluently topic-specific outputs (e.g., text and/or images). In many instances, a generative model refers to an advanced computational system that uses natural language processing, machine learning, and/or image processing to generate coherent and contextually relevant human-like responses.

Generative AI models have applications in natural language understanding, content generation, text summarization, dialogue systems, language translation, creative writing assistance, image generation, audio generation, and more. A single generative AI model often performs a wide range of tasks by receiving different inputs, such as prompts (e.g., input instructions, rules, example inputs, example outputs, and/or tasks), data, and/or access to data. In response, the generative AI model generates various output formats ranging from one-word answers to long narratives, images and videos, labeled datasets, documents, tables, and presentations.

Moreover, generative AI models are primarily based on transformer architectures to understand, generate, and manipulate human language. Generative AI models can also use other types of architectures such as recurrent neural network (RNN) architecture, long short-term memory (LSTM) model architecture, convolutional neural network (CNN) architecture, or other types of architectures. Examples of generative AI models include generative pre-trained transformer (GPT) models such as GPT-3.5 and GPT-4, bidirectional encoder representations from transformers (BERT) model, text-to-text transfer transformer models like T5, conditional transformer language (CTRL) models, and Turing-NLG. Other types of generative AI models include sequence-to-sequence models (Seq2Seq), vanilla RNNs, and LSTM networks. In some instances, a generative AI model includes a large language model (LLM), which serves as a text-based version of a generative AI model, such as one that receives text prompts and/or generates text outputs. In various implementations, a generative AI model is a multimodal generative model that receives multiple input formats (e.g., text, images, video, data structures) and/or generates multiple output formats.

As an example, the terms "prompt," "model prompt," or "generative AI model prompt" refer to a request provided to a large generative model to create generative AI model output based on plain language guidance prompts. In some instances, the codebase integration system provides additional information with a prompt. A prompt can include a user-level prompt that includes a user request, or a system-level or meta-level prompt that provides important contextual information and/or general framing information to ensure that the generative AI model understands the correct context, syntax, and grounding information of the data it is processing. Examples of prompts include codebase query prompts and evaluation prompts, as further described below.

Implementation examples and details of the codebase integration system are discussed in connection with the accompanying figures, which are described next. For example, FIG. 1 illustrates an overview of a codebase integration system configured to automatically integrate features into a codebase using generative AI models based on a user query according to some implementations. As shown, FIG. 1 includes a generative AI model 110 along with various steps of a multi-step process 100 performed by or with the codebase integration system. While FIG. 1 shows one instance of the generative AI model 110 for simplicity, the generative AI model 110 may represent multiple generative AI models.

As mentioned, the codebase integration system automatically integrates features requested in user queries into a codebase. To illustrate, the multi-step process 100 includes a first step 101 that includes codebase structure analysis. For example, in connection with receiving one or more user queries with feature requests, the codebase integration system generates (or otherwise obtains) a codebase index 114 of a codebase 112. As mentioned, a codebase index provides the organization and/or structure of the codebase. Additional details regarding generating and obtaining codebase indexes are provided below in connection with FIG. 3.

Step 102 includes prediction and evaluation. In various implementations, the codebase integration system determines locations in the codebase where the requested feature should be integrated. In some instances, the codebase integration system utilizes the user query, the generative AI model 110, and a first iterative process to determine an entry point 116 (or multiple codebase entry points) for adding or modifying code to integrate the requested feature. Additional details regarding identifying entry points in a codebase are provided below in connection with FIGS. 4A-4B.

Step 103 includes logical code outline generation. In one or more implementations, the codebase integration system generates a logical code outline 118, which provides an outline or roadmap for writing code that implements the required feature, including necessary resources. In some instances, the codebase integration system provides different outline instructions for each file or location within the codebase 112 that needs to be modified with new feature code. In some instances, the codebase integration system utilizes the user query, the entry point 116, the generative AI model 110, and a second iterative process to generate the logical code outline 118. Additional details regarding generating logical code outlines are provided below in connection with FIGS. 5A-5B.

Step 104 includes new code generation (e.g., new feature code generation). In some implementations, the codebase integration system generates new code to integrate the requested feature. If multiple files need to be modified with different versions of new code, the codebase integration system can process, create, and integrate new feature code for each file in parallel. In various instances, the codebase integration system utilizes the user query, the entry point 116, the logical code outline 118, the generative AI model 110, and a third iterative process to generate the new code 120. Additional details regarding generating new code are provided below in connection with FIGS. 6A-6B.

Step 105 includes new code integration. For example, the codebase integration system merges the new code 120 with existing code in the codebase 112 to implement the new code 120 into production. In various implementations, the codebase integration system utilizes the generative AI model 110 to finalize integrating the new code 120 into the codebase 112. Additional details regarding integrating new code into the codebase are provided below in connection with FIG. 7.

Figure 2:
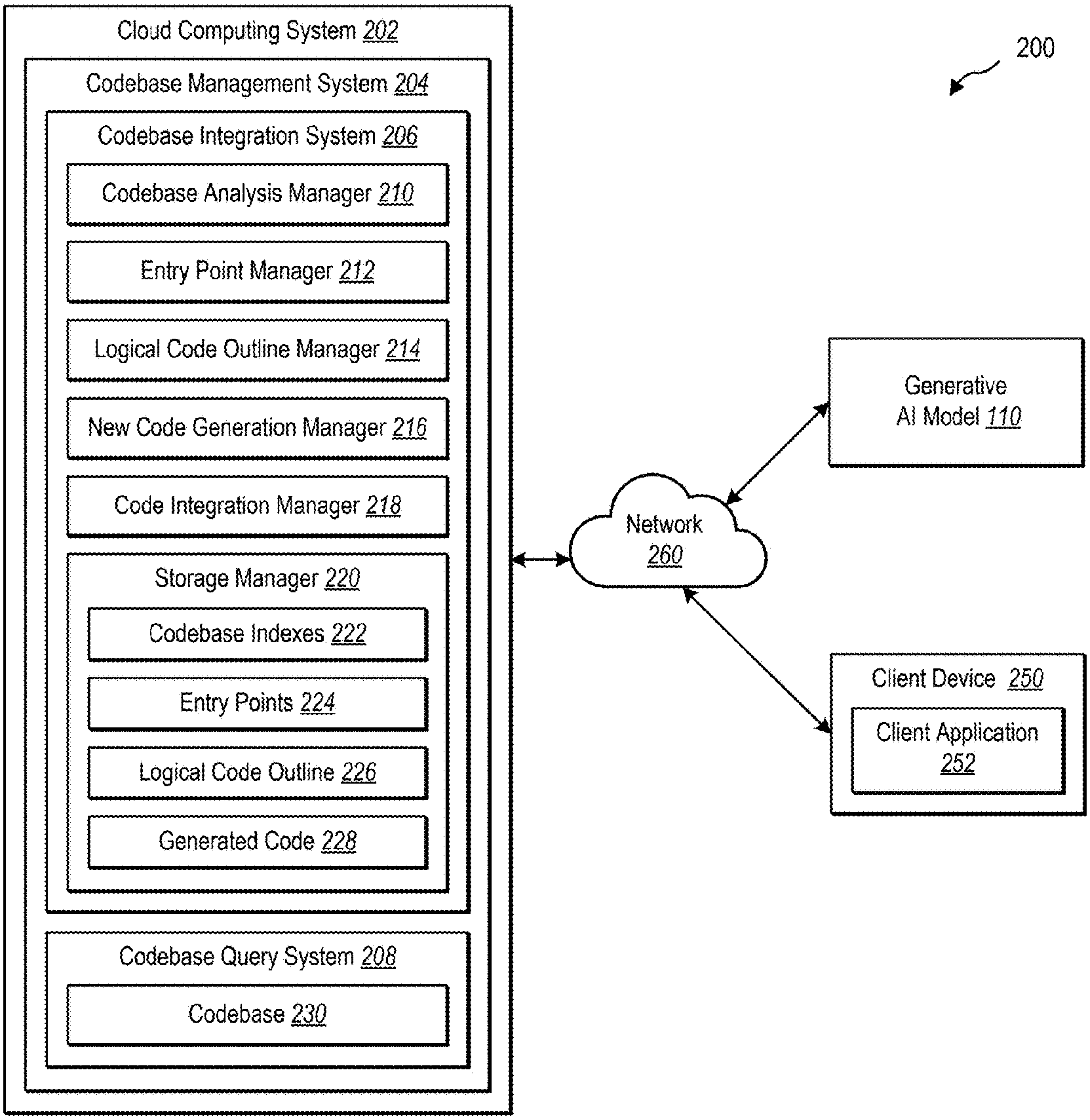
FIG. 2 illustrates an example computing environment in which the codebase integration system is implemented.

With a general overview in place, additional details are provided regarding the components, features, and elements of the codebase integration system. To illustrate, FIG. 2 shows an example computing environment in which the codebase integration system is implemented according to some implementations. In particular, FIG. 2 illustrates an example of a computing environment 200 having various computing devices, including a cloud computing system 202 associated with a codebase integration system 206. While FIG. 2 shows example arrangements and configurations of the computing environment 200, the cloud computing system 202, the codebase integration system 206, and associated components, other arrangements and configurations are possible.

As shown, the computing environment 200 includes the cloud computing system 202, a generative AI model 110, and a client device 250 connected via a network 260. Many of these components may be implemented on one or more computing devices, such as on one or more server devices. Further details regarding computing devices are provided below in connection with FIG. 9, along with additional details regarding networks, such as the network 260 shown.

Before describing components of the cloud computing system 202, including the codebase integration system 206, other components of the computing environment 200 are first discussed to provide better context when discussing the codebase integration system 206. The generative AI model 110 creates generative outputs (e.g., output responses) from input prompts. For example, the generative AI model 110 generates codebase query and evaluation responses for corresponding prompts from the codebase integration system 206. In various implementations, the generative AI model 110 is a pre-trained language model, as described above.

The generative AI model 110 represents a single generative AI model or multiple generative AI models. In some implementations, the generative AI model 110 represents multiple instances of the same generative AI model. In some implementations, the generative AI model represents different types of generative AI models. Indeed, the codebase integration system 206 may utilize the same or different generative AI models for each of the steps and/or within an iterative process of a step.

As shown, the computing environment 200 includes the client device 250. In various implementations, the client device 250 is associated with a user (e.g., a user client device), such as a user who provides a user query. In various instances, the client device 250 includes a client application 252, such as a terminal, web browser, mobile application, or another form of computer application for accessing and/or interacting with the cloud computing system 202 and/or the codebase integration system 206. For example, the client device 250 provides a user query with a feature request to the codebase integration system 206 to implement the requested feature in a codebase.

Returning to the cloud computing system 202, as shown, the cloud computing system 202 includes a codebase management system 204, which implements the codebase integration system 206 and a codebase query system 208. In various implementations, the codebase query system 208 facilitates maintaining and searching a codebase 230. For example, the codebase query system 208 performs codebase search queries to identify and obtain code snippets and/or templates from the codebase. In various implementations, the codebase 230 is located elsewhere in the cloud computing system 202 or on an external computing device.

The codebase integration system 206, in some implementations, is located on a separate computing device from the codebase management system 204 within the cloud computing system 202 or is located apart from the cloud computing system 202. In various implementations, the codebase management system 204 operates without the codebase integration system 206.

In various implementations, including the illustrated implementation, the codebase integration system 206 includes various components and elements that are implemented in hardware and/or software. For example, the codebase integration system 206 includes a codebase analysis manager 210 that generates and/or otherwise obtains codebase indexes 222 from the codebase 230, an entry point manager 212 that determines entry points 224 based on the codebase indexes 222 and a user query, a logical code outline manager 214 that generates logical code outlines 226 from the entry points 224, a new code generation manager 216 that generates generated code 228 using the logical code outlines 226, a code integration manager 218 that integrates the generated code 228 into the codebase 230, and a storage manager 220. As shown, the storage manager 220 includes codebase indexes 222, entry points 224, logical code outlines 226, and generated code 228 among other data.

In various implementations, one or more of the components of the codebase integration system 206 communicate with the generative AI model 110 to provide prompts and receive responses. Examples of prompts and responses are included in many of the following figures.

The components included in the codebase integration system 206 illustrate one example of a hardware and/or software architecture for performing the techniques and functions described in this document. The codebase integration system 206 may include additional and/or different components that perform similar and/or different actions. As described, the codebase integration system 206 may utilize and/or be configured to various implementations, as described above and further described below.

Figure 3:
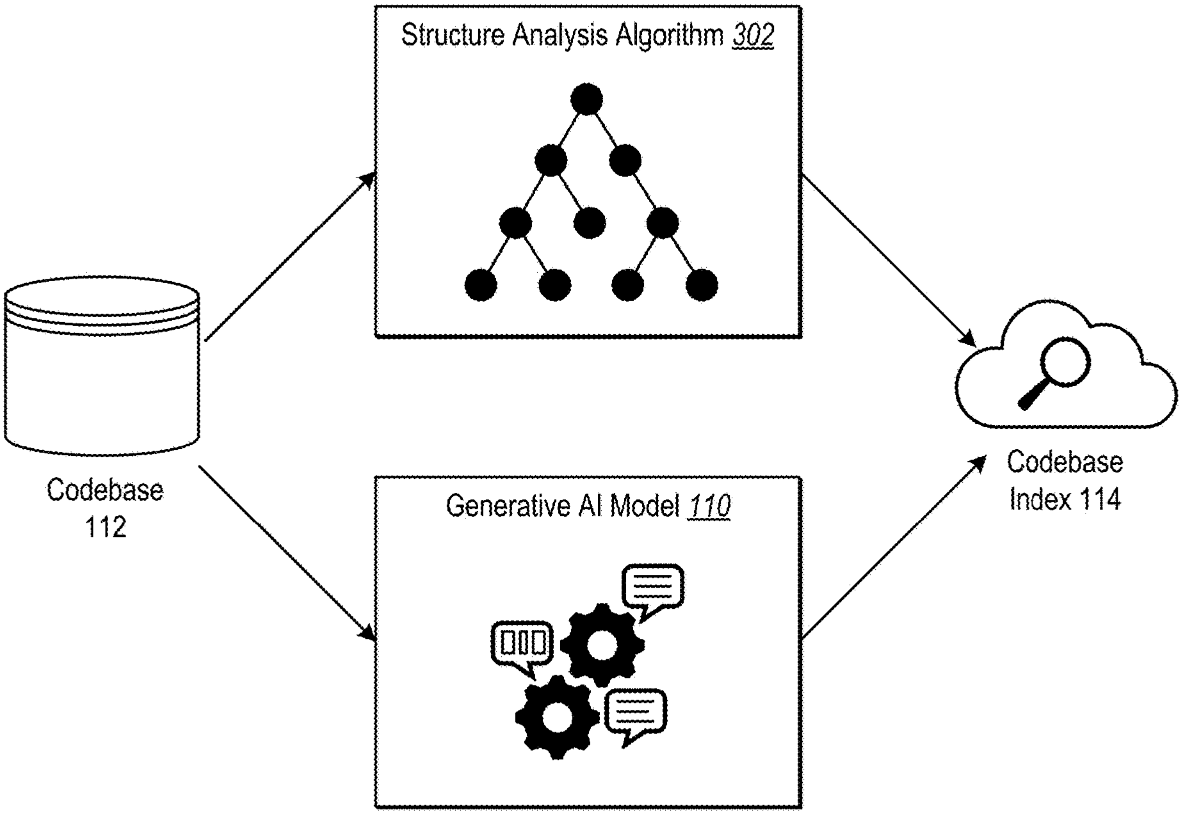
FIG. 3 illustrates an example diagram of generating a codebase index from a codebase.

As mentioned above, FIG. 3 provides additional details regarding generating and obtaining codebase indexes. FIG. 3 corresponds to the first step of codebase structure analysis introduced above. In particular, FIG. 3 illustrates an example diagram of generating a codebase index from a codebase according to some implementations.

As shown, FIG. 3 includes the codebase 112, the codebase index 114, and the generative AI model 110 (e.g., one or more generative AI models) introduced above. FIG. 3 also includes a structure analysis algorithm 302.

FIG. 3 illustrates the codebase integration system 206 generating the codebase index 114 from the codebase 112. For example, the codebase integration system 206 analyzes the structure of the existing codebase to understand the organization of the code, dependencies between different parts, and the design patterns used, which is reflected in the codebase index 114. In this way, the codebase integration system 206 may then use the codebase index 114 to more easily add new features or change existing features. Indeed, the codebase index 114 provides structural data at a high level that reflects the architecture of the codebase 112.

As shown, FIG. 3 illustrates the codebase integration system 206 generating the codebase index 114 from the codebase 112 using either the structure analysis algorithm 302 or the generative AI model 110. In various implementations, using the structure analysis algorithm 302 involves examining the elements in the code of the codebase, such as classes, functions, parameters, definitions, and references to understand the organization and the dependencies within the code. For example, by analyzing the codebase 112, the structure analysis algorithm 302 determines how different classes and functions interact with each other, what parameters they take, and where they are defined and referenced.

In many implementations, the structure analysis algorithm 302 outputs a detailed overview of the codebase architecture within the codebase index 114. In this way, the codebase integration system may use the codebase index 114 to identify where and how to implement new features in the corresponding codebase. Indeed, in various implementations, the codebase index 114 indicates an organizational structure and dependencies with code of the codebase.

FIG. 3 also includes using the generative AI model 110. For example, the codebase integration system 206 utilizes the generative AI model 110 to summarize the code and/or provide a logical explanation. For example, the codebase integration system 206 provides a codebase index creation prompt to an instance of the generative AI model 110 to process the code in the codebase 112 and generate a summary as part of the codebase index 114 that describes what the code does (e.g., a summary of the codebase and/or a summary of functions within the codebase). In some instances, the summary provides a high-level overview of the code's functionality and aids in understanding complex codebases, including how different parts of the code work together to achieve the desired functionality. Additionally, as further described below, the summary can assist in identifying potential integration points for new features and in understanding the impact of adding new code.

In some instances, the codebase integration system 206 utilizes either the structure analysis algorithm 302, the generative AI model 110, or both to generate the codebase index 114. In some implementations, the codebase index 114 has been previously generated for the codebase 112. For example, the codebase integration system 206 previously generated the codebase index 114 when automatically integrating a requested feature from a previous user query. In some implementations, another system creates the codebase index 114.

Figure 4B:
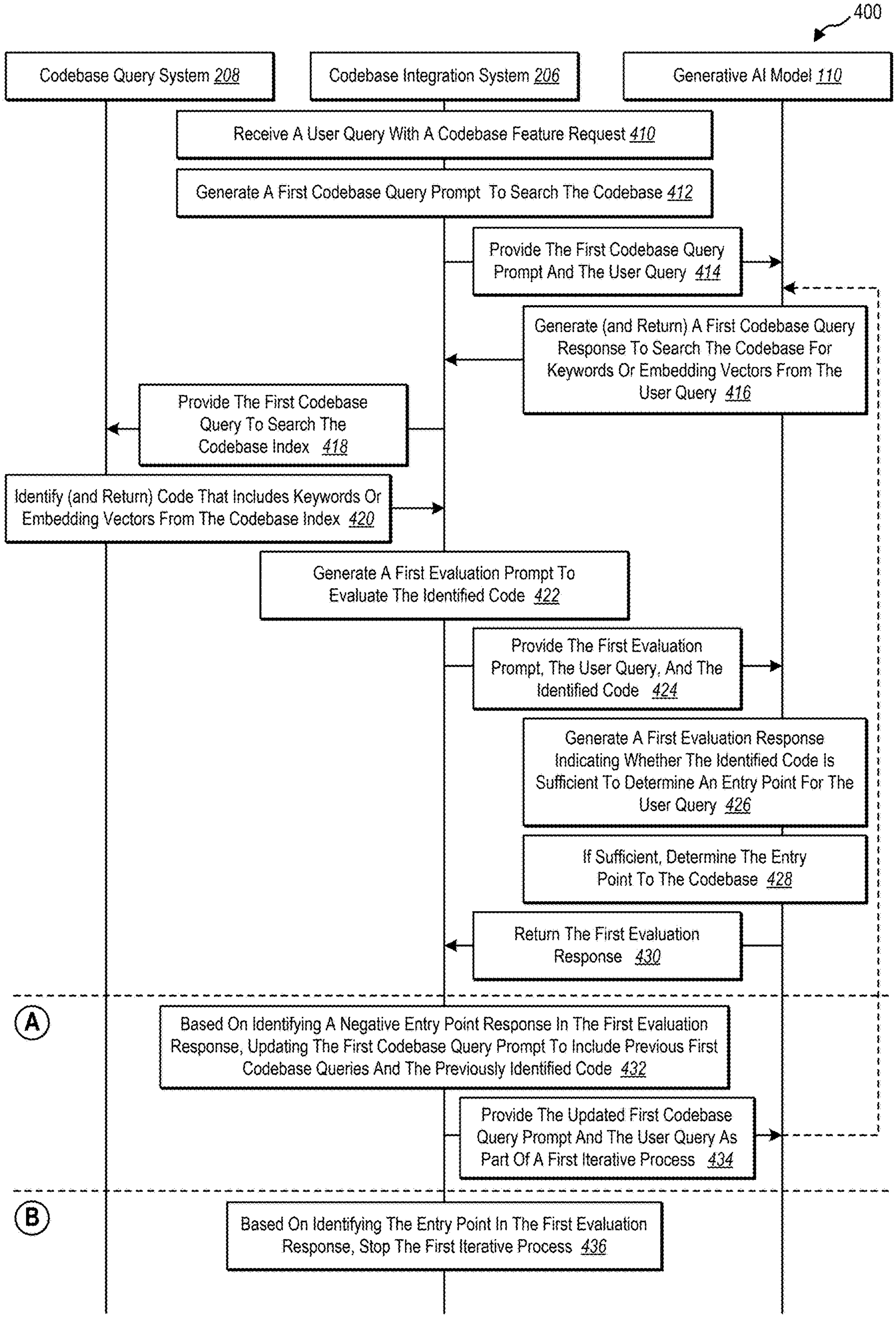
FIGS. 4A-4B illustrate example block and sequence diagrams of using generative AI models and a first iterative process to determine codebase entry points.
Figure 4A:
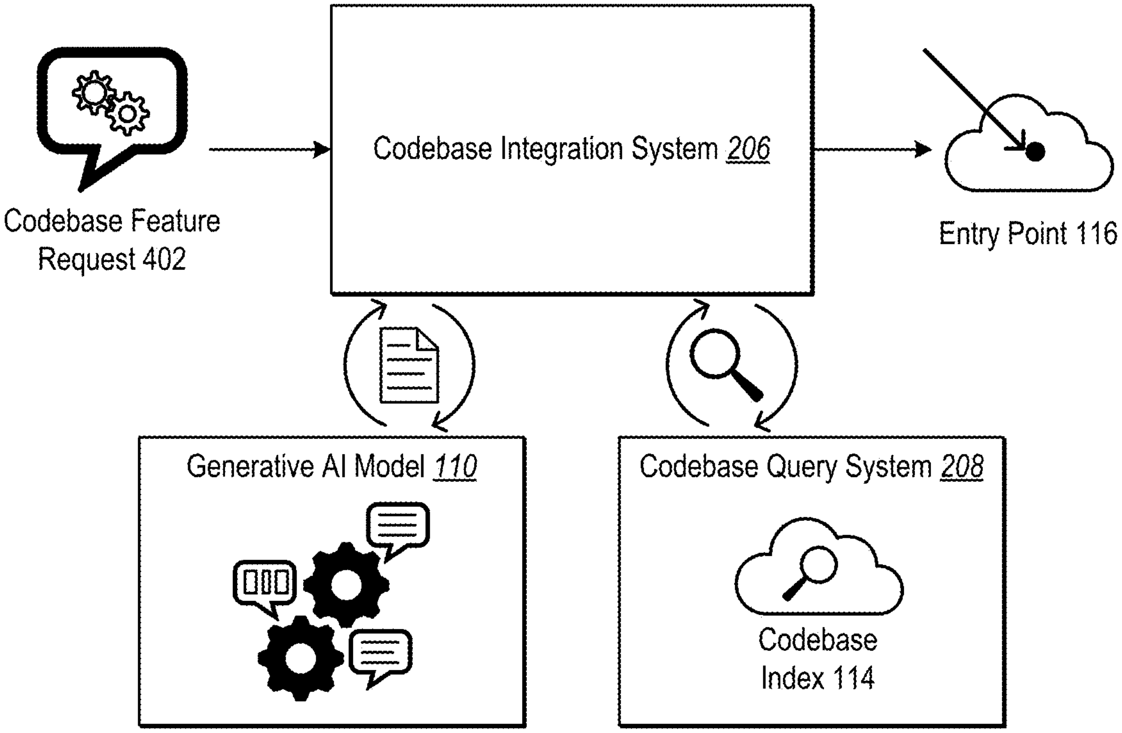

As mentioned above, FIGS. 4A-4B provide additional details regarding identifying entry points in a codebase. FIGS. 4A-4B correspond to the second step of prediction and evaluation introduced above. In particular, FIGS. 4A-4B illustrate example block and sequence diagrams of using generative AI models and a first iterative process to determine codebase entry points according to some implementations. FIG. 4A includes an example block diagram while FIG. 4B includes sequence flow diagrams.

FIG. 4A provides an overview of the components that interact with each other to identify an entry point 116 (or multiple entry points) for integrating a requested user feature into the codebase. As shown, FIG. 4A includes the codebase integration system 206, a codebase feature request 402, the generative AI model 110, the codebase query system 208, and the entry point 116 (which may represent multiple entry points).

At a high level, the codebase integration system 206 receives a codebase feature request 402 from a user query. In response, the codebase integration system 206 performs a first iterative process with the generative AI model 110 and the codebase query system 208 until satisfactory entry point(s) are identified. In this way, the codebase integration system 206 can identify the most suitable point(s) in the codebase to begin integrating new code. Indeed, the codebase integration system 206 uses the generative AI model 110 to suggest where new code should be integrated (e.g., where the requested feature could be logically and efficiently integrated) based on the existing structure and dependencies of the codebase.

As further described in FIG. 4B, the codebase integration system 206 uses the generative AI model 110 to generate codebase search queries, which are executed by the codebase query system 208 against the codebase index to locate code associated with entry points. The codebase integration system 206 then uses the generative AI model 110 again to evaluate the identified code against the task of locating relevant code. If the results are not satisfactory (e.g., no entry points or the entry points do not correlate to the user query), the codebase integration system 206 repeats the process of generating search queries, searching the codebase index, and evaluating the results until satisfactory results are achieved or an iteration limit is reached.

Turning to FIG. 4B, this figure includes more details regarding actions and communications between the codebase integration system 206, the generative AI model 110, and the codebase query system 208 as part of a first iterative process of identifying one or more entry points. In many implementations, FIG. 4B includes a series of acts 400 performed by or for the codebase integration system 206.

To illustrate, act 410 includes receiving a user query with a codebase feature request. For instance, the codebase integration system 206 receives a user query from a client device associated with a user where the user query includes a request to integrate a feature into a codebase. The request may be to add a new feature to the codebase or to modify an existing feature of the codebase.

The codebase integration system 206 allows user queries from users with a range of experience, from novice users to experienced users, and can automatically process the feature request regardless of its complexity. In some instances, the user query includes a specific request or a general question about the code in the codebase. For example, consider a user query that states, "I want to add a skill to the chat function of Codebase A. Help me write the code to enable a spreadsheet extension to be used with Skill B." In this example, the user is requesting that the codebase integration system 206 automatically create and integrate a new feature that allows Skill B to handle spreadsheet files where Skill B is part of a software solution associated with Codebase A.

Act 412 includes generating a first codebase query prompt to search the codebase. For instance, upon receiving the user query with the feature request, the codebase integration system 206 provides the user query to the generative AI model 110. In various implementations, as part of providing the user query to the generative AI model 110, the codebase integration system 206 generates a prompt to provide instructions for processing the user query.

To illustrate, the codebase integration system 206 generates a first codebase search query prompt that instructs the generative AI model 110 to generate a first codebase query (e.g., search query) to identify code within the codebase index that includes keywords or embedding vectors identified in the user query. For example, the first codebase query instructs the generative AI model 110 to determine what information in the codebase is needed to fulfill the requested feature and where the code is located. In some implementations, the first codebase query prompt serves as an entry point location prompt to locate one or more codebase entry points related to the requested feature.

Act 414 includes the codebase integration system 206 providing the first codebase query prompt and the user query to the generative AI model 110. For example, the codebase integration system 206 provides the first codebase query prompt with instructions to generate a search query for identifying locations in the codebase to integrate the requested feature. Additionally, the codebase integration system 206 also provides the user query to the generative AI model 110 to be processed according to the first codebase query prompt.

Act 416 includes the generative AI model 110 generating a first codebase query response to search the codebase for keywords or embedding vectors from the user query and returning the response to the generative AI model 110. In particular, in various instances, upon processing the first codebase query prompt based on the user query, the generative AI model 110 generates a new specific search query to search the codebase index for relevant keywords or embeddings included in the user query. The generative AI model 110 then returns the generated first codebase query response to the codebase integration system 206.

Act 418 includes the codebase integration system 206 providing the first codebase query to search the codebase index to the codebase query system 208. For example, upon receiving the first codebase query response that includes a search query to identify one or more codebase entry points for the requested feature, the codebase integration system 206 provides the search query to the codebase query system 208.

Act 420 includes the codebase query system 208 identifying code that includes keywords or embedding vectors from the codebase index and returning the result. For example, the codebase query system 208 executes the provided generated search code against the codebase index. The codebase query system 208 searches specific functions, classes, or other code elements that match the keywords or embeddings indicated in the search query. Once identified, the codebase query system 208 fetches the code from its corresponding location and returns it to the codebase integration system 206.

Act 422 includes the codebase integration system 206 generating a first evaluation prompt to evaluate the identified code. For example, the codebase integration system 206 generates a first evaluation prompt that includes instructions to determine whether the code retrieved from the codebase index based on executing the first codebase query is sufficient to determine the entry point. The first evaluation prompt instructs a generative AI model to compare the identified code to the user query to determine whether the code corresponds to the requested feature in the user query. Additionally, if the identified code is determined to be sufficient, the first evaluation prompt also prompts the generative AI model to determine the entry point using the provided input.

Act 424 includes the codebase integration system 206 providing the first evaluation prompt, the user query, and the identified code to the generative AI model 110. In various implementations, the codebase integration system 206 utilizes the same or different generative AI model to evaluate whether the identified code is sufficient to identify the codebase entry points for the required feature. For example, in some instances, the codebase integration system 206 utilizes the same generative AI model for all prompts. In other instances, the codebase integration system 206 utilizes multiple generative AI models to process the different prompts.

In response to receiving the first evaluation prompt, the generative AI model 110 generates a first evaluation response indicating whether the identified code is sufficient to determine an entry point for the user query, as shown in act 426. For example, the generative AI model 110 determines that the identified code is sufficient if it identifies the codebase entry points where the code implementing the requested feature will need to be added and/or modified. In these cases, the codebase integration system determines the entry point to the codebase, as shown in act 428, using the provided input and based on the instructions included in the first evaluation prompt.

In some instances, the generative AI model 110 determines that the identified code is not sufficient to identify the entry point or that the provided entry points do not correspond to the user query. In these instances, the generative AI model 110 may indicate its determination of insufficient entry points in a first evaluation response, as described below.

Act 430 includes the generative AI model 110 returning the first evaluation response. If the identified code is not sufficient, the first evaluation response indicates a negative entry point response. Otherwise, if the identified code is sufficient, the first evaluation response includes one or more identified points generated by the generative AI model 110 from the located code.

To illustrate, the series of acts 400 includes two paths, shown as Path A and Path B. In Path A, act 432 includes identifying a negative entry point response in the first evaluation response. In particular, act 432 includes the codebase integration system 206 updating the first codebase query prompt to include previous first codebase queries and the previously identified code based on identifying the negative entry point response in the first evaluation response.

To elaborate, without an insufficient entry point or entry points, the codebase integration system 206 cannot automatically integrate the requested feature. Accordingly, the codebase integration system 206 can repeat the above acts in the series of acts 400 to generate different search queries and locate different entry points within the codebase. In various implementations, the codebase integration system provides the previous first codebase queries and the previously identified code in another instance of the first codebase query prompt along with instructions that those queries and identified code were insufficient. In this case, the codebase integration system 206 utilizes in-context learning to improve the accuracy of the generative AI model 110 without needing to fine-tune or retrain the model.

In Path A, act 434 includes the codebase integration system 206 providing the updated first codebase query prompt (e.g., another instance of the second codebase query prompt) and the user query as part of the first iterative process. For example, providing a second instance of the updated first codebase query prompt to the codebase integration system 206 instructs the generative AI model 110 to generate an improved, more targeted and relevant search query than in the first round.

As shown, act 434 includes a dashed line that returns to the series of acts 400 just before act 416. The codebase integration system may then repeat acts 416-430 as part of the first iteration process. For each round or iteration, the codebase integration system 206 learns (e.g., via reinforcement learning) to generate better search queries and locate better entry points until code corresponding to one or more sufficient entry points is identified. If the generative AI model 110 processes the first evaluation prompt and finds that the latest identified code is insufficient, the codebase integration system 206 may again repeat the loop of the first iteration process, generating additional instances of the first evaluation prompt.

In some instances, the codebase integration system 206 stops the first iterative process after a predetermined number of iterations (e.g., an iteration limit) if an entry point has not been successfully found. For example, the first iterative process is scheduled to stop after a predetermined number of iterations when instances of the code from the codebase index in previous iterations are not sufficient to determine the entry point. In some cases, the codebase integration system 206 stops after 5, 10, 20, or 50 iterations and notifies the client device that the user query cannot be fulfilled.

However, if during the second or later iterations, the generative AI model 110 determines that code located from the codebase index is sufficient, the generative AI model 110 follows the instructions in the first codebase query prompt to identify and report entry points, including them in the first evaluation response. For example, the generative AI model 110 includes the file name and function name in the file that represents an entry point in the first evaluation response provided to the codebase integration system 206. The generative AI model 110 can then include the entry point in the first evaluation response and provide it to the codebase integration system 206 (e.g., act 430).

As shown in Path B, act 436 includes stopping the first iterative process based on identifying the entry point in the first evaluation response. For example, upon receiving the first evaluation response, the codebase integration system 206 identifies that the response includes one or more entry points. If the first evaluation response includes one or more identified points in the codebase for the required feature of the user query, the codebase integration system may advance to the second iterative process, described in the next set of figures.

As described above, the codebase integration system 206 may perform the first iterative process until the generative AI model 110 has found one or more satisfactory entry points. Furthermore, using the generative AI model 110 in this manner allows the codebase integration system 206 to more dynamically and intelligently search the codebase, which increases the chances of finding the most suitable entry points for the new feature.

Once the entry points have been identified, the codebase integration system 206 can proceed to generate the code for the new feature. Accordingly, the codebase integration system 206 proceeds to the next steps of logical code outline generation (step 3) and new feature code generation (step 4), which are discussed in FIGS. 5A-5B and FIGS. 6A-6B, respectively.

Figure 5A:
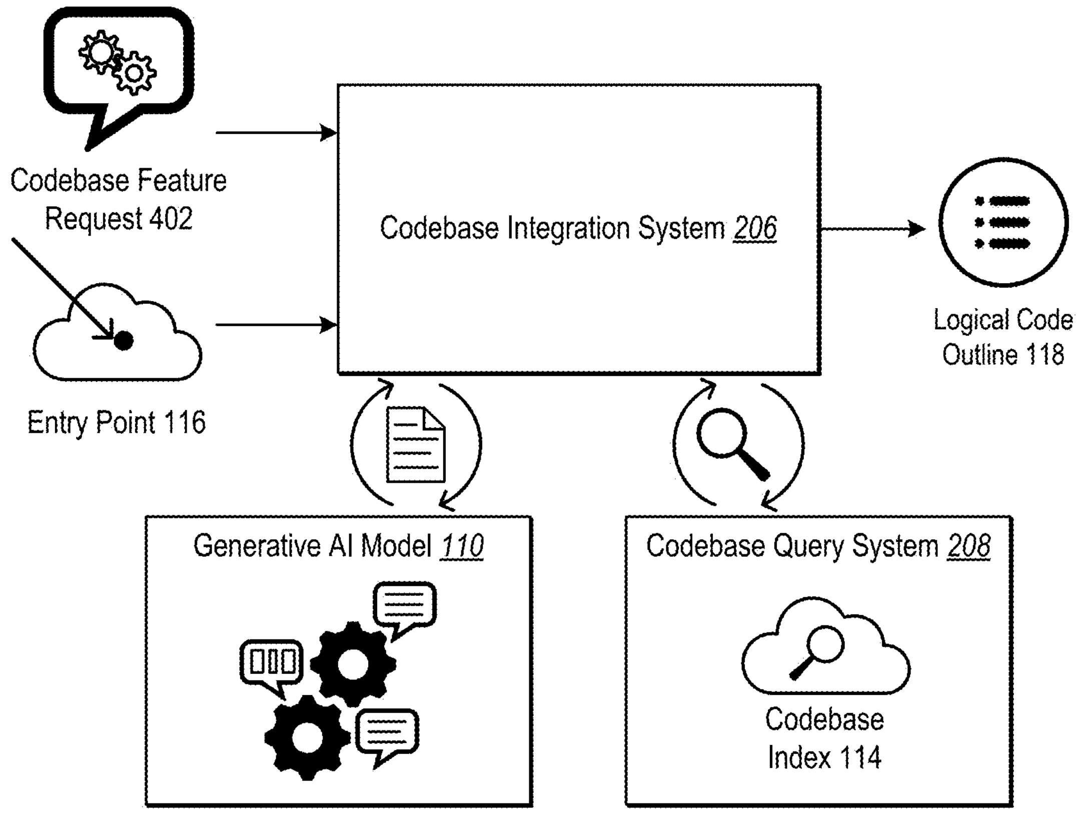
FIGS. 5A-5B illustrate example block and sequence diagrams of using generative AI models and a second iterative process to generate a logical code outline.
Figure 5B:
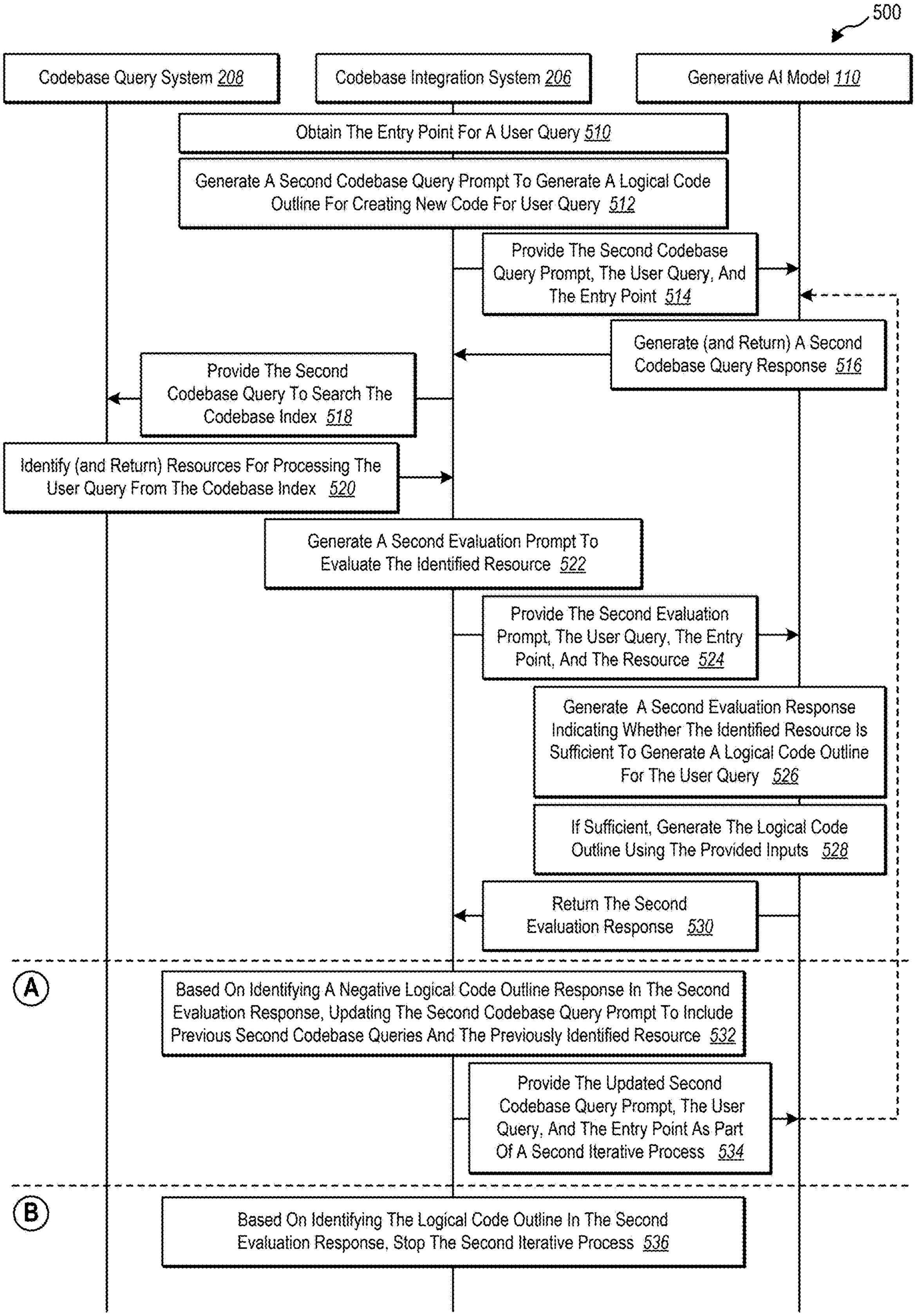

As mentioned above, FIGS. 5A-5B provide additional details regarding generating logical code outlines in a codebase. FIGS. 5A-5B correspond to the third step of logical code outline generation introduced above. In particular, FIGS. 5A-5B illustrate example block and sequence diagrams of using generative AI models and a second iterative process to generate logical code outlines according to some implementations. FIG. 5A includes an example block diagram while FIG. 5B includes sequence flow diagrams.

FIG. 5A provides an overview of the components that interact with each other to generate a logical code outline 118 (or multiple logical code outlines) for creating new code to integrate the requested feature into the codebase. Like FIG. 4A, FIG. 5A includes the codebase integration system 206, the generative AI model 110, and the codebase query system 208. FIG. 5A also includes the entry point 116, the codebase feature request 402, and the logical code outline 118 (which may represent multiple logical code outlines).

At a high level, in connection with receiving the codebase feature request 402 from a user query and upon performing the first iterative step of generating the entry point 116, the codebase integration system 206 can proceed to the second iterative step of generating a logical code outline. Like the first iterative step, the second iterative step includes the codebase integration system 206 using the generative AI model 110 and the codebase query system 208 until a satisfactory logical code outline is created. As mentioned, the logical code outline 118 serves as a roadmap for how the new feature code will be written including what resources (e.g., references) will be needed to write correct and working code.

As further described in FIG. 5B the codebase integration system 206 uses the generative AI model 110 to generate additional codebase search queries, which are executed by the codebase query system 208 against the codebase index to identify resources in the codebase index needed to create the new code. The codebase integration system 206 then uses the generative AI model 110 again to evaluate the identified resources against the task of writing the new code. If the results are not satisfactory (e.g., the identified code and resources are not sufficient to write new code for the requested feature), the codebase integration system 206 repeats the process of generating search queries, searching the codebase index, and evaluating the result until satisfactory results are achieved or an iteration limit is reached.

Turning to FIG. 5B, this figure includes more details regarding actions and communications between the codebase integration system 206, the generative AI model 110, and the codebase query system 208 as part of a second iterative process of generating a logical code outline. In many implementations, FIG. 5B includes a series of acts 500 performed by or for the codebase integration system 206.

To illustrate, act 510 includes obtaining the entry point for the user query, which is described above. Next, act 512 includes generating a second codebase query prompt to generate a logical code outline for creating new code for the user query. In various implementations, the codebase integration system 206 generates a second codebase search query prompt that instructs the generative AI model 110 to generate a second codebase query associated with generating the logical code outline. To illustrate, in various implementations, the second codebase search query prompt is a logical code outline generation prompt that instructs the generative AI model 110 to generate a search query to locate resources and references in the codebase needed to create a logical code outline based on the user query and the entry points.

Act 514 includes the codebase integration system 206 providing the second codebase query prompt, the user query, and the entry point to the generative AI model 110. In various implementations, the codebase integration system 206 utilizes the same or different generative AI models as previous generative AI model calls.

Act 516 includes the generative AI model 110 generating a second codebase query response to search the codebase (e.g., via the codebase index) for resources and references based on the user query and the entry points. In particular, in various instances, upon processing the second codebase query prompt, the generative AI model 110 determines an outline of what would be needed to fulfill the user query, then determines from the entry points what resources would be needed to write corresponding new feature code. The generative AI model 110 includes that information in a second codebase query response and returns the response to the codebase integration system 206.

Act 518 includes the codebase integration system 206 providing the second codebase query to search the codebase index to the codebase query system 208. Upon receiving the second codebase query response that includes a search query to identify resources, the codebase integration system 206 provides the search query to the codebase query system 208.

Act 520 includes the codebase query system 208 identifying resources for processing the user query from the codebase index. For example, the codebase query system 208 executes the search query to identify file paths, file types, and reference paths corresponding to the user query and the entry points, as instructed in the generated search query.

Act 522 includes the codebase integration system 206 generating a second evaluation prompt to evaluate the identified resources. For example, the codebase integration system 206 generates a second evaluation prompt that includes instructions to determine whether one or more resources retrieved from the codebase index, based on executing the second codebase query, are sufficient to generate the logical code outline. For instance, the second evaluation prompt instructs a generative AI model to compare the identified resources to the user query to determine whether the code corresponds to the requested feature in the user query.

In various implementations, the second evaluation prompt instructs the generative AI model 110 to initially generate a test logical code outline based on the identified resources, the user query, and context information about the codebase. For example, the instructions include generating a test logical code outline that includes a file path, a reference path, and code generation instructions for one or more files. Then, the second evaluation prompt instructs the generative AI model 110 to evaluate and/or compare the test logical code outline to the user query to determine whether the test logical code outline addresses the requested feature in the user query (e.g., to determine sufficiency).

Additionally, as part of act 522, if the identified resources and/or the test instance of the logical code outline are determined to be sufficient, the second evaluation prompt also prompts the generative AI model to generate the logical code outline. As mentioned, in some instances, if a test logical code outline is sufficient, then the generative AI model 110 can use and return the test logical code outline as the generated logical code outline, as further described below.

Act 524 includes the codebase integration system 206 providing the second evaluation prompt, the user query, the entry point, and the identified resources to the generative AI model 110. In various implementations, the codebase integration system 206 utilizes the same or different generative AI models as previous generative AI model calls, as described above.

In response to receiving the second evaluation prompt, the generative AI model 110 follows the prompt and generates a second evaluation response, which indicates whether the identified resource is sufficient to generate a logical code outline (e.g., a sufficient logical code outline) for the user query, as shown in act 526. For example, the generative AI model 110 determines that the identified resources are sufficient if they provide the necessary resources and enable the generative AI model 110 to generate instructions for creating new code that integrates the requested feature. In these cases, the codebase integration system 206 uses the generative AI model 110 to determine a logical code outline using the provided inputs, as shown in act 528. In some instances, the generative AI model 110 uses the test logical code outline, as described above.

In some instances, the generative AI model 110 determines that the identified resources are not sufficient to aid in generating the logical code outline. In these instances, the generative AI model 110 may indicate its determination of insufficient resources in a second evaluation response, as described below.

Act 530 includes the generative AI model 110 returning the second evaluation response. If the identified code is not sufficient, the second evaluation response indicates a negative logical code outline response. Otherwise, if the identified code is sufficient, the second evaluation response includes the logical code outline generated by the generative AI model 110 from the located resources, user query, and entry points, as described below.

To illustrate, the series of acts 500 includes two paths, shown as Path A and Path B. In Path A, act 532 includes identifying a negative logical code outline response in the second evaluation response. Based on identifying a negative logical code outline response in the second evaluation response, the codebase integration system 206 updates the second codebase query prompt to include previous second codebase queries and the previously identified resource, which is used in a new iteration of the second iterative process.

To elaborate, in cases where there are insufficient resources, the codebase integration system 206 cannot automatically create new feature code to integrate the requested feature or generate a sufficient logical code outline. Consequently, the codebase integration system 206 may repeat the above acts in the series of acts 500 to generate different search queries and identify additional resources from the codebase. In many implementations, the codebase integration system provides the previous second codebase queries, the previously identified resources, and/or test logical code outlines in another instance of the second codebase query prompt (or the second evaluation prompt) along with instructions that those queries, identified resources, and tests were insufficient. Once again, the codebase integration system 206 can utilize in-context learning to improve the accuracy of the generative AI model 110 without needing to fine-tune or retrain the model.

If the codebase integration system 206 repeats the second iterative process, each time it generates a new instance of the second codebase query prompt, it can continue to add one or more previous examples of failed or insufficient search queries, identified resources, and/or tests. This allows the generative AI model 110 to generate improved search queries that identify better resources, which may include fewer resources than in previous rounds.

In Path A, act 534 includes the codebase integration system 206 providing the updated second codebase query prompt (e.g., another instance of the second codebase query prompt) and the user query as part of a second iterative process. For example, providing the updated second codebase query prompt to the codebase integration system 206 instructs the generative AI model 110 to generate more improved, targeted, and relevant search query than in previous rounds.

As shown, act 534 includes a dashed line that returns to the series of acts 500 just before act 516. The codebase integration system may then repeat acts 516-530 as part of the second iteration process. For each round or iteration, the codebase integration system 206 learns (e.g., via reinforcement learning) to generate better search queries and locate better resources corresponding to the user query. If the generative AI model 110 processes the second evaluation prompt and finds that the latest identified resources and/or test logical code outline are insufficient, the codebase integration system 206 may again repeat the loop of the second iteration process, generating additional instances of the second evaluation prompt. In some instances, the second iterative process stops (e.g., is scheduled to stop) after a predetermined number of iterations is reached without a satisfactory logical code outline.

However, if during the second or later iterations, the generative AI model 110 determines that the identified resources and/or tests are sufficient (e.g., the test logical code outline makes sense in the context of the existing codebase and aligns with the user query), the generative AI model 110 may follow the instructions in the first codebase query prompt to generate a logical code outline. The generative AI model 110 then includes the logical code outline in the second evaluation response and provides it to the codebase integration system 206 (e.g., act 530).

In some instances, a logical code outline includes multiple outline portions corresponding to different entry points, files, classes, or functions. For example, when each of these components, the generative AI model 110 generates an outline portion that includes a file path of the file in the codebase, file type (e.g., new or existing), one or more reference file paths needed to execute instructions, and instructions on how to generate the new feature code. The generative AI model 110 may include multiple outline portions in the same logical code outline or as separate logical code outlines. In various implementations, the logical code outline is provided as JSON or another data structure.

As shown in Path B, act 536 includes stopping the second process based on identifying the logical code outline in the second evaluation response. For example, upon receiving the second evaluation response, the codebase integration system 206 identifies that the response includes one or more logical code outlines. If the second evaluation response includes a logical code outline, the codebase integration system may advance to the third iterative process, described in the next set of figures.

As an example of test logical code outlines evolving over the iteration rounds, consider the following test logical code outline samples for one outline portion:

| First Iteration |
|---|
| File_path: File_A-Path<br>File_type: Existing<br>Reference_file_path: Helper_A-Path<br>Instructions: In Class A, add a new method, Understanding_Spreadsheets, that takes the parameters Param A, Param B, and optional Param C. Use Method D from Helper A to receive the spreadsheet content. Process the content as required for the skill. Ensure to follow the existing patterns for error handling, logging, and returning responses. |

| Second Iteration |
|---|
| File_path: File_A-Path<br>File_type: Existing<br>Reference_file_path: Helper_A_Reference_Path, Skill_B-Path, Skill_C-Path, Skill_D-Path, Skill_E-Path<br>Instructions: In Class A, add a new method, Get_Info_Spreadsheets, to handle spreadsheet files. Use Package A to read the spreadsheet files. The method should accept Param A, Param D, and Param E as parameters. It should use Helper A to read the entire workbook or specific sheets based on UserPrompt. Use try-except blocks for error handling, similar to existing methods in the class. Update the Get_Info_Content method to call Get_Info_Spreadsheets when a spreadsheet file is detected. Ensure to handle errors and return content, APIUsage, and ErrorMessages. |

| Third Iteration |
|---|
| File_path: File_A-Path<br>File_type: Existing<br>Reference_file_path: Skill_B-Path, Helper_A_Reference_Path<br>Instructions: In Class A, add a new method, Get_Info_Spreadsheets, to handle spreadsheet files. Use Package A to read the spreadsheet content. The method should accept Param A and Param D as parameters, and return the content of the spreadsheet file or specific sheets if specified. Use Class B from Helper A to interact with Storage A. Handle exceptions and return error messages. |

As described above, the codebase integration system 206 may perform the second iterative process until the generative AI model 110 has found one or more satisfactory resources and/or generated a logical code outline that corresponds to the codebase and aligns with the user query. Once the logical code outline has been generated, the codebase integration system 206 can finalize generating new code for the new feature. Accordingly, the codebase integration system 206 proceeds to the next steps of new code generation (step 4), which will be discussed next in FIGS. 6A-6B.

Figure 6A:
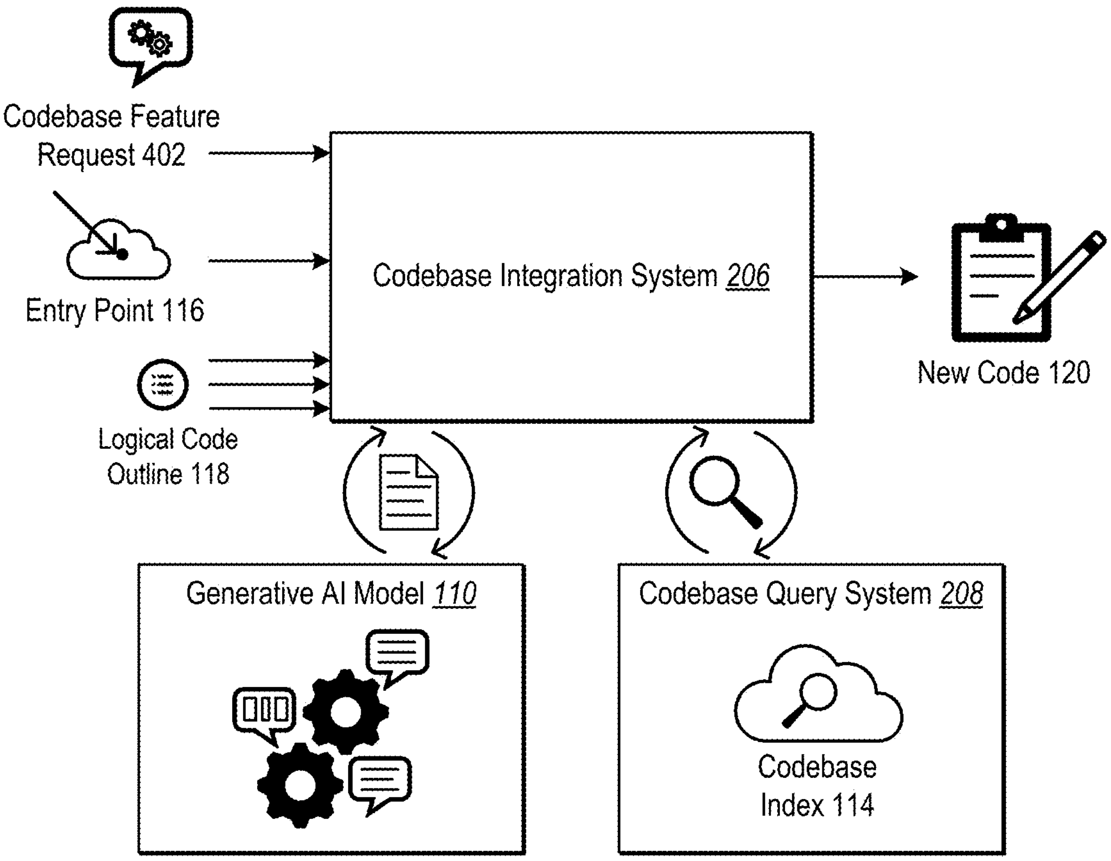
FIGS. 6A-6B illustrate example block and sequence diagrams of using generative AI models and a third iterative process to generate new feature code in the codebase.
Figure 6B:
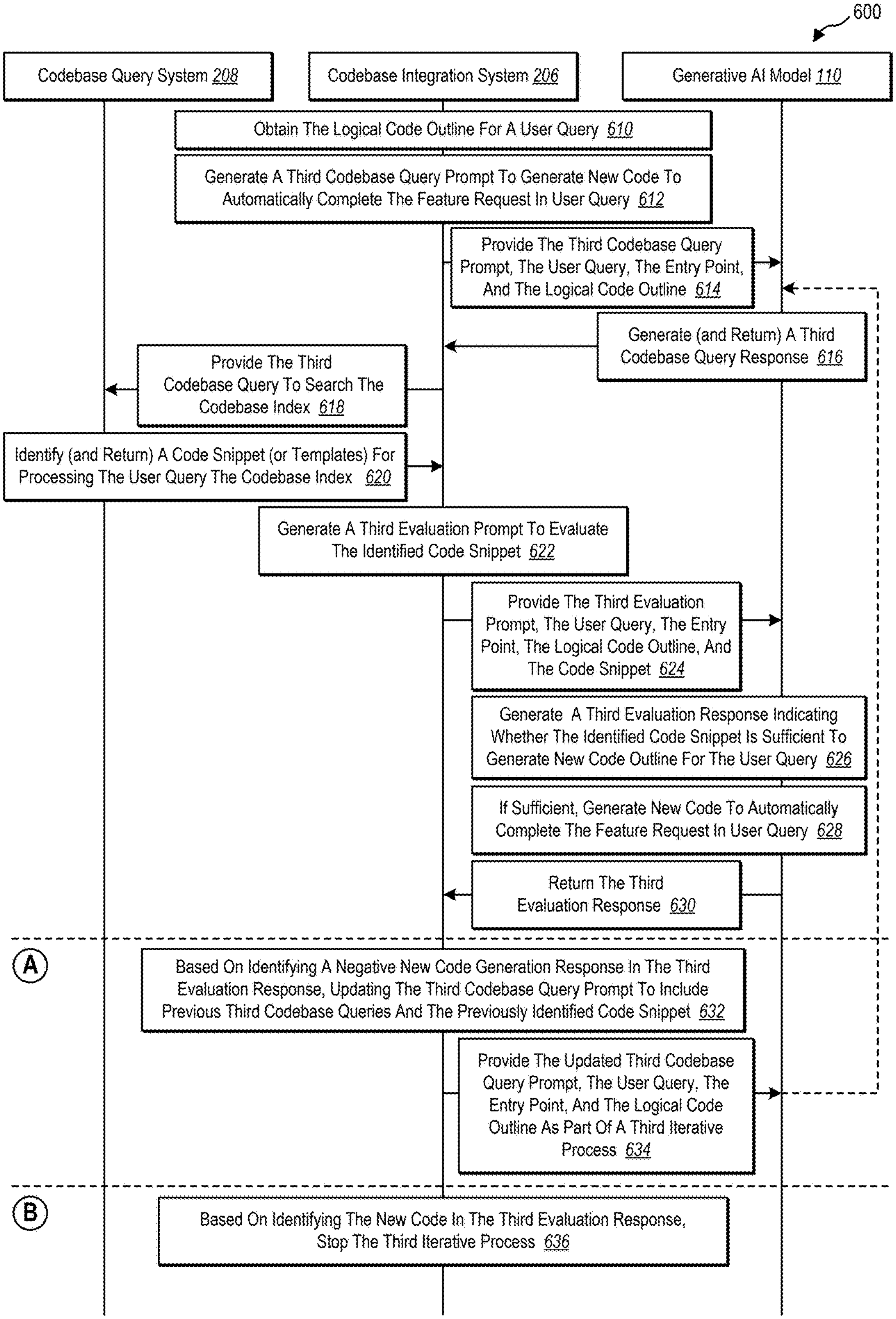

As mentioned previously, FIGS. 6A-6B provide additional details regarding generating new code to integrate the requested feature in the user query into the codebase. FIGS. 6A-6B correspond to the fourth step of new code generation introduced above. In particular, FIGS. 6A-6B illustrate example block and sequence diagrams of using generative AI models and a third iterative process to generate new feature code in the codebase according to some implementations. FIG. 6A includes an example block diagram while FIG. 6B includes sequence flow diagrams.

FIG. 6A provides an overview of the components that interact with each other to generate new code 120 to integrate the requested feature into the codebase. Like FIG. 4A and FIG. 5A, FIG. 6A includes the codebase integration system 206, the generative AI model 110, and the codebase query system 208. FIG. 6A also includes the entry point 116, the codebase feature request 402, the logical code outline 118, and the new code 120.

At a high level, after completing the first and second iterative steps including generating a logical code outline 118 for one or more entries the codebase integration system 206 can generate the new code. Like the first and second iterative steps, the third iterative step includes the codebase integration system 206 using the generative AI model 110 and the codebase query system 208 until new code is generated to a satisfactory level.

As further described in FIG. 6B, the codebase integration system 206 uses the generative AI model 110 to generate additional codebase search queries, which are executed by the codebase query system 208 against the codebase index to identify one or more code snippets and/or code templates that are useful in creating the new feature code. The codebase integration system 206 then uses the generative AI model 110 again to evaluate the code snippets and templates against the task of writing the new code. If the snippets, templates, and/or test instances of new code are not satisfactory, the codebase integration system 206 repeats the process of generating search queries, searching the codebase index, and evaluating the results until satisfactory results are achieved or an iteration limit is reached.

Turning to FIG. 6B, this figure includes more details regarding actions and communications between the codebase integration system 206, the generative AI model 110, and the codebase query system 208 as part of a third iterative process of generating new code for a requested feature within the user query. In many implementations, FIG. 6B include a series of acts 600 performed by or for the codebase integration system 206.

To illustrate, act 610 includes obtaining the logical code outline for the user query, which is described above. In various implementations, the logical code outline includes multiple outline portions. In these implementations, the codebase integration system 206 may repeat acts 612-636 for each file. In various implementations, the codebase integration system 206 performs these operations in parallel using the same or different generative AI models, including different instances of the same generative AI model. When processing multiple files from the logical code outline in parallel, the codebase integration system 206 avoids piecemeal edits and may significantly increase the efficiency of automatically integrating new feature code into the codebase.

For each file or outline portion, act 612 includes generating a third codebase query prompt to generate the new code for the requested feature in the user query. In various implementations, the codebase integration system 206 generates a third codebase search query prompt that instructs the generative AI model 110 to generate a third codebase query for identifying code snippets relevant to the particular file being processed in the logical code outline. To illustrate, in various implementations, the third codebase search query prompt is a file-based code snippet prompt that instructs the generative AI model 110 to generate a search query based on the user query, the entry points, and the logical code outline (e.g., the outline portion associated with the particular file) to identify relevant code snippets needed to create a portion of the new feature code for the particular file.

Act 614 includes the codebase integration system 206 providing the third codebase query prompt, the user query, the entry point, and the logical code outline to the generative AI model 110. In some implementations, the codebase integration system 206 utilizes the same or different generative AI models as previous generative AI model calls.

Act 616 includes the generative AI model 110 generating a third codebase query response to search the codebase (e.g., via the codebase index) for resources and references based on the inputs. In particular, in various instances, upon processing the third codebase query prompt, the generative AI model 110 determines code snippets and/or templates that would aid in generating new code for the particular file in the codebase to integrate the requested feature from the user query.

Act 618 includes the codebase integration system 206 providing the third codebase query to search the codebase index to the codebase query system 208. Upon receiving the third codebase query response that includes the generated search query to identify useful code snippets for adding code to the particular file, the codebase integration system 206 provides the search query to the codebase query system 208.

Act 620 includes the codebase query system 208 identifying code snippets and/or code templates from the codebase index. For example, the codebase query system 208 executes the search query to pull relevant code snippets or templates from the codebase index corresponding to the particular file.

Act 622 includes the codebase integration system 206 generating a third evaluation prompt to evaluate the code snippets and templates. For example, the codebase integration system 206 generates a third evaluation prompt that includes instructions to determine whether one or more code snippets and/or code templates retrieved from the codebase index, based on executing the third codebase query, are sufficient to generate the new code for the particular file.

In various implementations, the third evaluation prompt instructs the generative AI model 110 to initially generate a test instance of the new code based on the code snippets and templates, the user query, and context information about the codebase. For example, the instructions include generating a test instance of the new code for the particular file based on the inputs including the code snippets and/or code templates. Then, the third evaluation prompt instructs the generative AI model 110 to evaluate and/or compare the test instance of the new code to the user query to determine whether the test instance of the new code addresses the requested feature in the user query (e.g., to determine sufficiency).

In various implementations, as part of generating the test instance of the new code and/or the new code, the codebase integration system 206 may provide instructions to the generative AI model 110 to generate the new code that matches the attributes, styles, syntaxes, and patterns of the existing code in the codebase. Indeed, in various instances, the codebase integration system 206 uses the generative AI model 110 to analyze the structural and referential information of the code repository and generate new/synthesized code that matches existing patterns in the code database or repository. Furthermore, by matching the attributes of the codebase, the codebase integration system 206 ensures that newly generated code instances in multiple files across the codebase are consistent.

Additionally, as part of act 622, if the identified resources and/or the test instance of the new feature code outline are determined to be sufficient, the second evaluation prompt also prompts the generative AI model to generate the new code. In some of these instances, the generative AI model 110 can use and return the test instance of the new code as the generated new code, as described further below.

Act 624 includes the codebase integration system 206 providing the third evaluation prompt, the user query, the entry point, the logical code outline, and the code snippets and templates to the generative AI model 110. In various implementations, the codebase integration system 206 utilizes the same or different generative AI models as previous generative AI model calls, as described above.

In response to receiving the third evaluation prompt, the generative AI model 110 follows the prompt and generates a third evaluation response, which indicates whether the identified resource is sufficient to generate new code for the user query (e.g., for the particular file), as shown in act 626. As described above, the generative AI model 110 determines whether the code snippets and templates and/or a test instance of new code are sufficient based on the instructions in the third evaluation prompt. If found sufficient, the codebase integration system 206 uses the generative AI model 110 to determine new code (for the particular file) to automatically complete the feature request in the user query, as shown in act 628. In some instances, the generative AI model 110 uses the test instance of the new code, as described above.

In some instances, the generative AI model 110 determines that the identified resources are not sufficient to aid in generating the new code. In these instances, the generative AI model 110 may indicate its determination of insufficient resources in a third evaluation response, as described below.

Act 630 includes the generative AI model 110 returning the third evaluation response. If the identified code is not sufficient, the third evaluation response indicates a negative new code generation response. Otherwise, if the identified code is sufficient, the third evaluation response includes the new feature code generated by the generative AI model 110 from the located resources, user query, entry points, and logical code outline, as described below.

As shown, the series of acts 600 includes two paths, Path A and Path B. In Path A, act 632 includes identifying a negative new code generation response in the third evaluation response. Based on identifying a negative new code generation response in the third evaluation response, the codebase integration system 206 updates the third codebase query prompt to include previous third codebase queries and the previously identified code snippets and/or test instances of new code, which are used in a new iteration or round of the third iterative process.

To elaborate, when insufficient resources are determined, the codebase integration system 206 cannot create the new feature code. Consequently, the codebase integration system 206 can repeat the above acts in the series of acts 600 to generate different search queries and identify additional code snippets and templates from the codebase. In many implementations, the codebase integration system provides the previously used third codebase queries, code snippets and templates, and/or test instances of new feature code in another instance of the third codebase query prompt (or the third evaluation prompt) along with instructions indicating that those queries, code snippets, and tests were insufficient. Once again, the codebase integration system 206 can utilize in-context learning to improve the accuracy of the generative AI model 110 without the need to fine-tune or retrain the model.

If the codebase integration system 206 repeats the third iterative process, each time it generates a new instance of the third codebase query prompt, it can continue to add one or more previous examples of failed or insufficient search queries, code snippets and templates, and/or tests. This allows the generative AI model 110 to generate improved search queries that identify better code snippets, which results in better instances of the test new feature code.

In Path A, act 634 includes the codebase integration system 206 providing the updated third codebase query prompt, the user query, the entry point, and the logical code outline as part of the third iterative process. For instance, providing the updated third codebase query prompt to the codebase integration system 206 instructs the generative AI model 110 to generate an improved, more targeted, and relevant search query compared to previous rounds.

As shown, act 634 includes a dashed line that returns to the series of acts 600 just before act 616. The codebase integration system may then repeat acts 616-630 as part of the third iteration process. For each round or iteration, the codebase integration system 206 learns (e.g., via reinforcement learning) to generate better search queries and locate better code snippets and templates corresponding to generating new code for a particular file. If the generative AI model 110 processes the third evaluation prompt and finds that the latest code snippets and templates and/or test instances of the new code are insufficient, the codebase integration system 206 may again repeat the loop of the third iteration process, generating additional instances of the third evaluation prompt. In some instances, the codebase integration system 206 may stop (e.g., is scheduled to stop) the third iterative process after a predetermined number of iterations is reached without a satisfactory logical code outline.

However, if during the second or later iterations, the generative AI model 110 determines that the code snippets, templates, and/or tests are sufficient, the generative AI model 110 may follow the instructions in the first codebase query prompt to generate the new code for the particular file (or all files in the logical code outline). The generative AI model 110 then includes the new feature code in the third evaluation response and provides it to the codebase integration system 206 (e.g., act 630).

As shown, act 636 in Path B includes stopping the third process based on identifying the new code in the third evaluation response. For example, upon receiving the third evaluation response, the codebase integration system 206 identifies that the response includes new feature code for the particular file. If the third evaluation response includes the new code, the codebase integration system may advance to the fifth step. Indeed, the codebase integration system 206 may perform the third iterative process until the generative AI model 110 has generated new feature code to integrate into the codebase. Furthermore, once the codebase integration system 206 generates instances of new feature code for multiple files in the logical code outline (if multiple outline portions are present), the codebase integration system 206 proceeds to the next steps of new code integration (Step 5), which is discussed next in FIG. 7.

Figure 7:
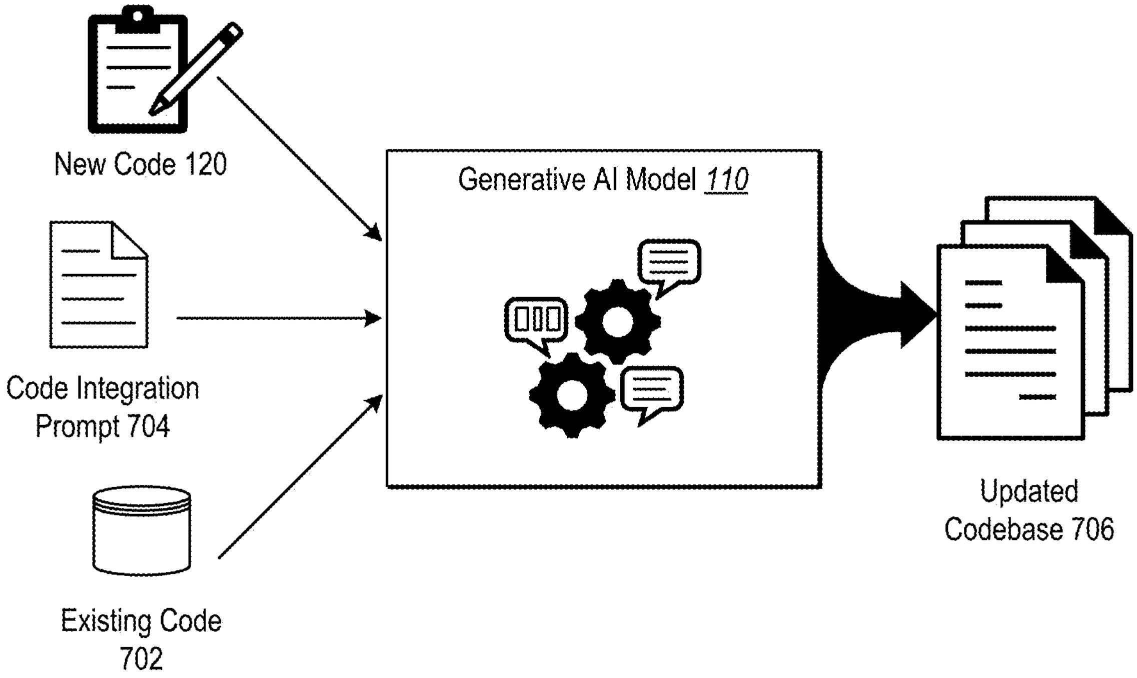
FIG. 7 illustrates an example diagram of integrating newly generated feature code into the codebase.

As mentioned above, FIG. 7 provides additional details regarding integrating new code into the codebase. In particular, FIG. 7 illustrates an example diagram of integrating newly generated feature code into the codebase according to some implementations. As shown, FIG. 7 includes the generative AI model 110 and the new code 120, introduced above. FIG. 7 also includes existing code 702, a code integration prompt 704, and an updated codebase 706.

As illustrated in FIG. 7, the codebase integration system 206 provides the new code 120 and the existing code 702 to the generative AI model 110, along with the code integration prompt 704 that instructs the generative AI model 110 to integrate instances of the new code 120 into the existing code 702 based on the entry points.

For instance, once the codebase integration system 206 generates and finalizes the new code for the new feature, the codebase integration system 206 may use the same or a different generative AI model to merge the new code 120 with the existing code 702 to generate the updated codebase 706. In addition, the code integration prompt 704 may also instruct the generative AI model 110 to resolve any conflicts that arise (e.g., hanging resources and/or potential errors from reference naming differences) and adjust as needed to ensure the new code works seamlessly with the rest of the codebase.

In some implementations, the codebase integration system 206 also performs additional reviews and tests. In some of these instances, the codebase integration system 206 utilizes the generative AI model 110 to identify and fix any detected issues.

Figure 8:
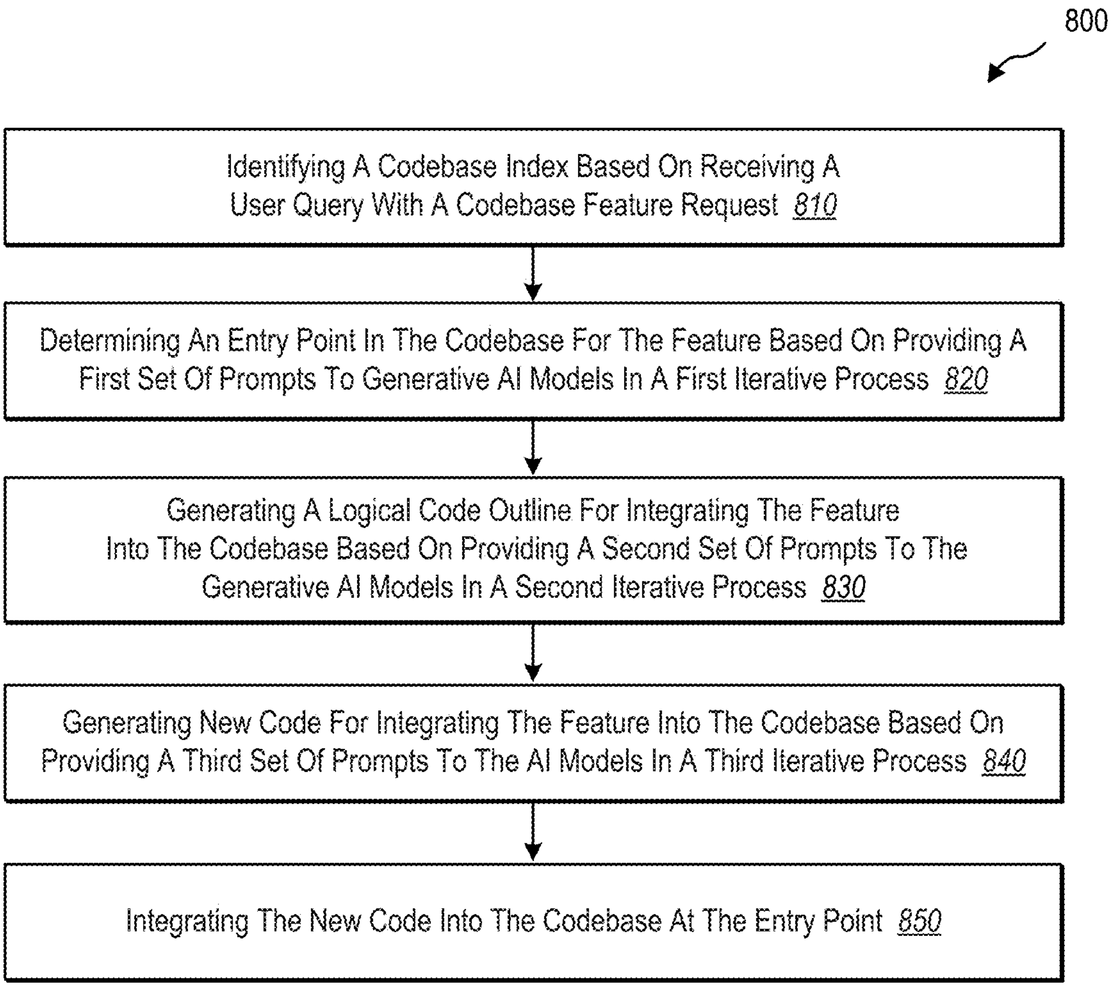
FIG. 8 illustrates an example series of acts in a computer-implemented method for integrating a codebase feature into an existing codebase using one or more generative artificial intelligence models.

Turning now to FIG. 8, this figure illustrates an example series of acts in a computer-implemented method for integrating a codebase feature into an existing codebase using one or more generative artificial intelligence (AI) models, according to some implementations. While FIG. 8 illustrates acts according to one or more implementations, alternative implementations may omit, add, reorder, and/or modify any of the acts shown.

The acts in FIG. 8 can be performed as part of a method (e.g., a computer-implemented method). Alternatively, a computer-readable medium can include instructions that, when executed by a processing system with a processor, cause a computing device to perform the acts in FIG. 8. In some implementations, a system (e.g., a processing system comprising a processor) can perform the acts in FIG. 8. For example, the system includes a processing system and a computer memory including instructions that, when executed by the processing system, cause the system to perform various actions, operations, or steps.

To illustrate, in FIG. 8, the series of acts 800 includes act 810 of identifying a codebase index based on receiving a user query with a codebase feature request. For instance, in example implementations, act 810 involves identifying a codebase index of a codebase based on receiving a user query requesting to integrate a feature into the codebase. In some implementations, in act 810, integrating the feature includes adding a new feature to the codebase or modifying an existing feature of the codebase.

In some implementations, in connection with act 810, identifying the codebase index includes performing a structural analysis of the codebase to determine classes, functions, parameters, definitions, and references of the codebase. In some implementations, the codebase index indicates an organizational structure and dependencies of the code in the codebase. In some implementations, the codebase index includes a summary of the codebase and a summary of functions within the codebase. In some implementations, providing the first codebase query prompt to the one or more generative AI models includes generating the first codebase query prompt to instruct the one or more generative AI models to generate a first codebase query for identifying code that includes keywords or embedding vectors in the codebase associated with the user query, providing the user query and the first codebase query prompt to the one or more generative AI models, and receiving a first codebase query response from the one or more generative AI models that includes the first codebase query.

As further shown, the series of acts 800 includes act 820 of determining an entry point in the codebase for the feature based on providing a first set of prompts to generative AI models in a first iterative process. For instance, in example implementations, act 820 involves determining an entry point in the codebase for the feature based on providing a first codebase query prompt to one or more generative AI models and a first evaluation prompt to the one or more generative AI models in a first iterative process.

In some implementations, in act 820, providing the first evaluation prompt to the one or more generative AI models includes generating the first evaluation prompt to instruct the one or more generative AI models to determine whether the code retrieved from the codebase index, based on executing the first codebase query, is sufficient to determine the entry point and to determine the entry point if the code is sufficient; providing the user query, the code retrieved from the codebase index, and the first evaluation prompt to the one or more generative AI models; and if the code retrieved from the codebase index is not sufficient to determine the entry point, receiving a first evaluation response from the one or more generative AI models indicating a negative entry point response, or if the code retrieved from the codebase index is sufficient to determine the entry point, receiving the first evaluation response from the one or more generative AI models with the entry point.

In some implementations, the first iterative process includes receiving a first instance of the first codebase query from the one or more generative AI models upon providing the one or more generative AI models with a first instance of the first codebase query prompt, retrieving a first instance of the code from the codebase index using the first instance of the first codebase query, receiving a first instance of the first evaluation response from the one or more generative AI models indicating the negative entry point response upon providing a first instance of the first evaluation prompt to the one or more generative AI models, the user query, and the first instance of the code, updating the first codebase query prompt to include the first instance of the first codebase query and the first instance of the code to generate a second instance of the first codebase query prompt, receiving a second instance of the first codebase query from the one or more generative AI models upon providing the one or more generative AI models with the second instance of the first codebase query prompt, retrieving a second instance of the code from the codebase index using the second instance of the first codebase query, and receiving a second instance of the first evaluation response from the one or more generative AI models with the entry point for integrating the feature of the codebase upon providing a second instance of the first evaluation prompt, the user query, and the second instance of the code to the one or more generative AI models. In some implementations, the first iterative process is scheduled to stop after a predetermined number of iterations when instances of the code from the codebase index in previous iterations are not sufficient to determine the entry point.

As further shown, the series of acts 800 includes act 830 of generating a logical code outline for integrating the feature into the codebase based on providing a second set of prompts to the one or more generative AI models in a second iterative process. For instance, in some implementations, act 830 involves generating a logical code outline for integrating the feature into the codebase based on providing a second codebase query prompt to the one or more generative AI models and a second evaluation prompt to the one or more generative AI models in a second iterative process.

In some implementations, in act 830, providing the second codebase query prompt to the one or more generative AI models includes generating the second codebase query prompt to instruct the one or more generative AI models to generate a second codebase query associated with generating the logical code outline for creating the new code, wherein the logical code outline includes a file path, a reference path, and code generation instructions for one or more files, providing the user query, the entry point, and the second codebase query prompt to the one or more generative AI models, and receiving a second codebase query response from the one or more generative AI models that includes the second codebase query.

In some implementations, providing the second evaluation prompt to the one or more generative AI models includes generating the second evaluation prompt to instruct the one or more generative AI models to determine whether one or more resources retrieved from the codebase index, based on executing the second codebase query, is sufficient to generate the logical code outline and to generate the logical code outline if the one or more resources are sufficient; providing the user query, the one or more resources retrieved from the codebase index, and the second evaluation prompt to the one or more generative AI models; and if the one or more resources retrieved from the codebase index is not sufficient to generate the logical code outline, receiving a second evaluation response from the one or more generative AI models indicating a negative logical code outline response, or if the one or more resources retrieved from the codebase index is sufficient to generate the logical code outline, receiving the second evaluation response from the one or more generative AI models with the logical code outline.

In some implementations, the second iterative process includes receiving a first instance of the second codebase query from the one or more generative AI models upon providing the one or more generative AI models with a first instance of the second codebase query prompt, retrieving a first instance of the one or more resources from the codebase index using the first instance of the second codebase query, receiving a first instance of the second evaluation response from the one or more generative AI models indicating the negative logical code outline response upon providing a first instance of the second evaluation prompt to the one or more generative AI models, the user query, and the first instance of the one or more resources, updating the second codebase query prompt to include the first instance of the second codebase query and the first instance of the one or more resources to generate a second instance of the second codebase query prompt, receiving a second instance of the second codebase query from the one or more generative AI models upon providing the one or more generative AI models with the second instance of the second codebase query prompt, retrieving a second instance of the one or more resources from the codebase index using the second instance of the second codebase query, and receiving a second instance of the second evaluation response from the one or more generative AI models with the logical code outline for creating the new code upon providing a second instance of the second evaluation prompt, the user query, and the second instance of the one or more resources to the one or more generative AI models. In some implementations, the second iterative process is scheduled to stop after a predetermined number of iterations when instances of the one or more resources from the codebase index in previous iterations are not sufficient to generate the logical code outline.

Furthermore, the series of acts 800 includes act 840 of generating new code for integrating the feature into the codebase based on providing a third set of prompts to the generative AI models in a third iterative process. For instance, in example implementations, act 840 involves generating new code for integrating the feature into the codebase based on providing a third codebase query prompt to the one or more generative AI models and a third evaluation prompt to the one or more generative AI models in a third iterative process.

In some implementations, in act 840, providing the third codebase query prompt to the one or more generative AI models includes generating the third codebase query prompt to instruct the one or more generative AI models to generate a third codebase query associated with generating the new code, providing the user query, the entry point, the logical code outline, and the third codebase query prompt to the one or more generative AI models, and receiving a third codebase query response from the one or more generative AI models that includes the third codebase query.

In some implementations, providing the third evaluation prompt to the one or more generative AI models includes generating the third evaluation prompt to instruct the one or more generative AI models to determine whether one or more code snippets retrieved from the codebase index based on executing the third codebase query is sufficient to generate the new code and to generate the new code if the one or more code snippets are sufficient; providing the user query, the one or more code snippets retrieved from the codebase index, and the third evaluation prompt to the one or more generative AI models; and if the one or more code snippets retrieved from the codebase index is not sufficient to generate the new code, receiving a third evaluation response from the one or more generative AI models indicating a negative new code generation response, or if the one or more code snippets retrieved from the codebase index is sufficient to generate the new code, receiving the third evaluation response from the one or more generative AI models with the new code.

In some implementations, the third iterative process includes receiving a first instance of the third codebase query from the one or more generative AI models upon providing the one or more generative AI models with a first instance of the third codebase query prompt, retrieving a first instance of the one or more code snippets from the codebase index using the first instance of the third codebase query, and receiving a first instance of the third evaluation response from the one or more generative AI models indicating the negative new code generation response upon providing a first instance of the third evaluation prompt to the one or more generative AI models, the user query, the logical code outline, and the first instance of the one or more code snippets or templates, updating the third codebase query prompt to include the first instance of the third codebase query and the first instance of the one or more code snippets to generate a second instance of the third codebase query prompt, receiving a second instance of the third codebase query from the one or more generative AI models upon providing the one or more generative AI models with the second instance of the third codebase query prompt, retrieving a second instance of the one or more code snippets from the codebase index using the second instance of the third codebase query, and receiving a second instance of the third evaluation response from the one or more generative AI models with the new code upon providing a second instance of the third evaluation prompt, the user query, the logical code outline, and the second instance of the one or more code snippets to the one or more generative AI models.

In some implementations, in act 840, generating the new code includes generating the new code for multiple files in the codebase in parallel from the logical code outline using the one or more generative AI models. In some implementations, generating the new code includes using the one or more generative AI models to generate the new code to match the style, syntax, and pattern attributes of existing code in the codebase.

As further shown, the series of acts 800 includes act 850 of integrating the new code into the codebase at the entry point. For instance, in some implementations, act 850 involves integrating the new code into the codebase at the entry point. In some implementations, in act 850, integrating the new code into the codebase at the entry point includes using the one or more generative AI models to merge the new code with corresponding existing code in the codebase.

Figure 9:
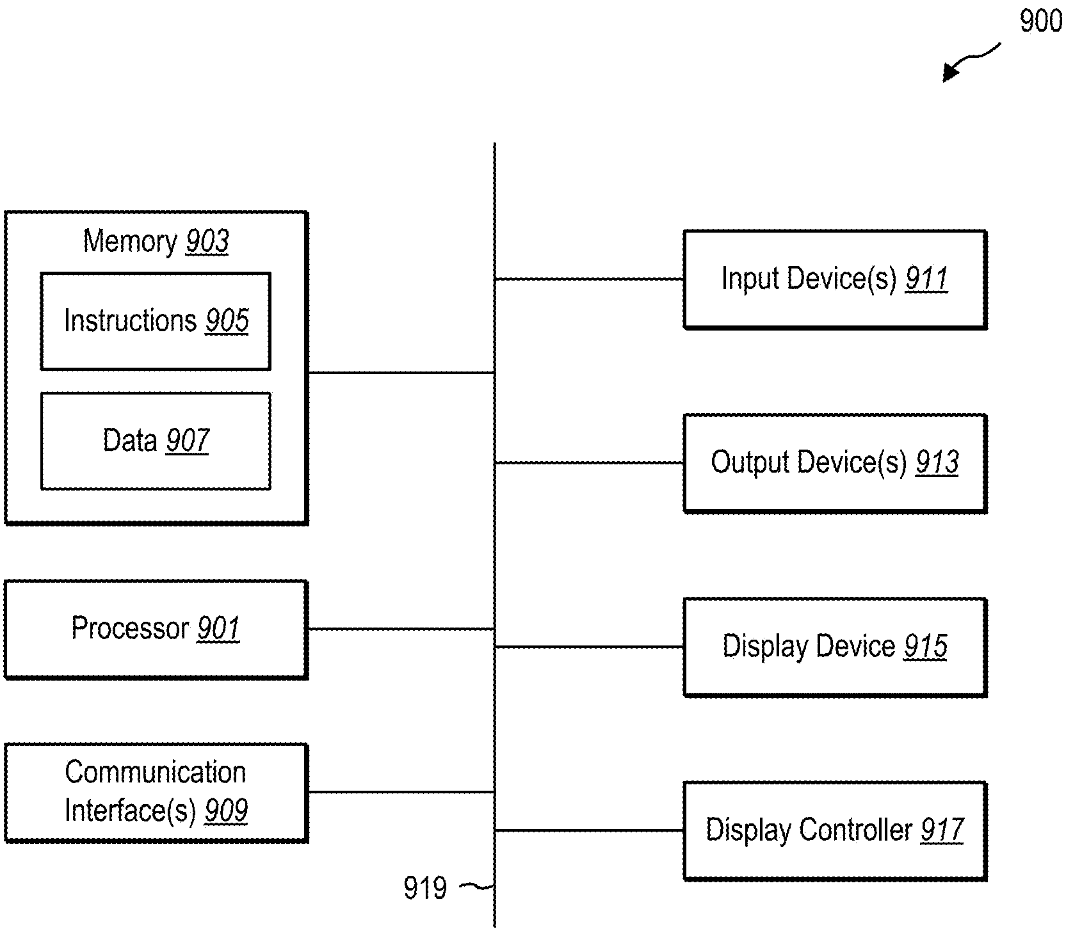
FIG. 9 illustrates example components included within a computer system used to implement the codebase integration system.

FIG. 9 illustrates certain components that may be included within a computer system 900. The computer system 900 may be used to implement the various computing devices, components, and systems described herein (e.g., by executing computer-implemented instructions). As used herein, a "computing device" refers to electronic components that perform a set of operations based on a set of programmed instructions. Computing devices include groups of electronic components, client devices, server devices, etc.

In various implementations, the computer system 900 represents one or more of the client devices, server devices, or other computing devices described above. For example, the computer system 900 may refer to various types of network devices capable of accessing data on a network, a cloud computing system, or another system. For instance, a client device may refer to a mobile device such as a mobile telephone, a smartphone, a personal digital assistant (PDA), a tablet, a laptop, or a wearable computing device (e.g., a headset or smartwatch). A client device may also refer to a non-mobile device such as a desktop computer, a server node (e.g., from another cloud computing system), or another non-portable device.

The computer system 900 includes a processing system including a processor 901. The processor 901 may be a general-purpose single- or multi-chip microprocessor (e.g., an Advanced Reduced Instruction Set Computer (RISC) Machine (ARM)), a special-purpose microprocessor (e.g., a digital signal processor (DSP)), a microcontroller, a programmable gate array, etc. The processor 901 may be referred to as a central processing unit (CPU) and may cause computer-implemented instructions to be performed. Although the processor 901 shown is just a single processor in the computer system 900 of FIG. 9, in an alternative configuration, a combination of processors (e.g., an ARM and DSP) could be used.

The computer system 900 also includes memory 903 in electronic communication with the processor 901. The memory 903 may be any electronic component capable of storing electronic information. For example, the memory 903 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers, and so forth, including combinations thereof.

The instructions 905 and the data 907 may be stored in the memory 903. The instructions 905 may be executable by the processor 901 to implement some or all of the functionality disclosed herein. Executing the instructions 905 may involve the use of the data 907 that is stored in the memory 903. Any of the various examples of modules and components described herein may be implemented, partially or wholly, as instructions 905 stored in memory 903 and executed by the processor 901. Any of the various examples of data described herein may be among the data 907 that is stored in memory 903 and used during the execution of the instructions 905 by the processor 901.

A computer system 900 may also include one or more communication interface(s) 909 for communicating with other electronic devices. The one or more communication interface(s) 909 may be based on wired communication technology, wireless communication technology, or both. Some examples of the one or more communication interface(s) 909 include a Universal Serial Bus (USB), an Ethernet adapter, a wireless adapter that operates according to an Institute of Electrical and Electronics Engineers (IEEE) 902.11 wireless communication protocol, a Bluetooth® wireless communication adapter, and an infrared (IR) communication port.

A computer system 900 may also include one or more input device(s) 911 and one or more output device(s) 913. Some examples of the one or more input device(s) 911 include a keyboard, mouse, microphone, remote control device, button, joystick, trackball, touchpad, and light pen. Some examples of the one or more output device(s) 913 include a speaker and a printer. A specific type of output device that is typically included in a computer system 900 is a display device 915. The display device 915 used with implementations disclosed herein may utilize any suitable image projection technology, such as liquid crystal display (LCD), light-emitting diode (LED), gas plasma, electroluminescence, or the like. A display controller 917 may also be provided, for converting data 907 stored in the memory 903 into text, graphics, and/or moving images (as appropriate) shown on the display device 915.

The various components of the computer system 900 may be coupled together by one or more buses, which may include a power bus, a control signal bus, a status signal bus, a data bus, etc. For clarity, the various buses are illustrated in FIG. 9 as a bus system 919.

Furthermore, upon reaching various computer system components, program code means in the form of computer-executable instructions or data structures can be transferred automatically from transmission media to non-transitory computer-readable storage media (devices), or vice versa. For example, computer-executable instructions or data structures received over a network or data link can be buffered in random-access memory (RAM) within a network interface module (NIC), and then it is eventually transferred to computer system RAM and/or to less volatile computer storage media (devices) at a computer system. Thus, it should be understood that computer-readable storage media (devices) can be included in computer system components that also (or even primarily) utilize transmission media.

Computer-executable instructions include instructions and data that, when executed by a processor, cause a general-purpose computer, special-purpose computer, or special-purpose processing device to perform a certain function or group of functions. In some implementations, computer-executable and/or computer-implemented instructions are executed by a general-purpose computer to turn the general-purpose computer into a special-purpose computer implementing elements of the disclosure. The computer-executable instructions may include, for example, binaries, intermediate format instructions such as assembly language, or even source code. Although the subject matter has been described in language specific to structural features and/or methodological acts, it is to be understood that the subject matter defined in the appended claims is not necessarily limited to the features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or a combination of hardwired and wireless data links) through a network, both perform tasks. In a distributed system environment, program modules may be located in both local and remote memory storage devices.

The techniques described herein may be implemented in hardware, software, firmware, or any combination thereof unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium, including instructions that, when executed by at least one processor, perform one or more of the methods described herein (including computer-implemented methods). The instructions may be organized into routines, programs, objects, components, data structures, etc., which may perform particular tasks and/or implement particular data types, and which may be combined or distributed as desired in various implementations.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, implementations of the disclosure can include at least two distinctly different kinds of computer-readable media: non-transitory computer-readable storage media (devices) and transmission media.

As used herein, computer-readable storage media (devices) may include RAM, ROM, EEPROM, CD-ROM, solid-state drives (SSDs) (e.g., based on RAM), Flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

The steps and/or actions of the methods described herein may be interchanged with one another without departing from the scope of the claims. In other words, unless a specific order of steps or actions is required for the proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a data repository, or another data structure), ascertaining, and the like. Also, "determining" can include receiving (e.g., receiving information), accessing (e.g., accessing data in a memory), and the like. Also, "determining" can include resolving, selecting, choosing, establishing, and the like.

The terms "comprising," "including," and "having" are intended to be inclusive and mean that there may be additional elements other than the listed elements. Additionally, it should be understood that references to "one implementation" or "implementations" of the present disclosure are not intended to be interpreted as excluding the existence of additional implementations that also incorporate the recited features. For example, any element or feature described concerning an implementation herein may be combinable with any element or feature of any other implementation described herein, where compatible.

The present disclosure may be embodied in other specific forms without departing from its spirit or characteristics. The described implementations are to be considered illustrative and not restrictive. The scope of the disclosure is indicated by the appended claims rather than by the foregoing description. Changes that come within the meaning and range of equivalency of the claims are to be embraced within their scope.

What is claimed is:

1. A computer-implemented method for integrating a codebase feature into an existing codebase using one or more generative artificial intelligence (AI) models, comprising:

identifying a codebase index of a codebase based on receiving a user query requesting to integrate a feature into the codebase;

determining an entry point in the codebase for the feature based on providing a first codebase query prompt to one or more generative AI models and a first evaluation prompt to the one or more generative AI models in a first iterative process;

generating a logical code outline for integrating the feature into the codebase based on providing a second codebase query prompt to the one or more generative AI models and a second evaluation prompt to the one or more generative AI models in a second iterative process;

generating new code for integrating the feature into the codebase based on providing a third codebase query prompt to the one or more generative AI models and a third evaluation prompt to the one or more generative AI models in a third iterative process; and integrating the new code into the codebase at the entry point.

2. The computer-implemented method of claim 1, wherein integrating the feature includes:

adding a new feature to the codebase; or modifying an existing feature of the codebase.

3. The computer-implemented method of claim 1, wherein identifying the codebase index includes performing a structural analysis of the codebase to determine classes, functions, parameters, definitions, and references of the codebase.

4. The computer-implemented method of claim 3, wherein the codebase index indicates an organizational structure and dependencies of the codebase.

5. The computer-implemented method of claim 1, wherein the codebase index includes a summary of the codebase and a summary of functions within the codebase.

6. The computer-implemented method of claim 1, wherein providing the first codebase query prompt to the one or more generative AI models includes:

generating the first codebase query prompt to instruct the one or more generative AI models to generate a first codebase query for identifying code that includes keywords or embedding vectors in the codebase associated with the user query;

providing the user query and the first codebase query prompt to the one or more generative AI models; and receiving a first codebase query response from the one or more generative AI models that includes the first codebase query.

7. The computer-implemented method of claim 6, wherein providing the first evaluation prompt to the one or more generative AI models includes:

generating the first evaluation prompt to instruct the one or more generative AI models to determine whether the code retrieved from the codebase index based on executing the first codebase query is sufficient to determine the entry point and to determine the entry point if the code is sufficient;

providing the user query, the code retrieved from the codebase index, and the first evaluation prompt to the one or more generative AI models;

if the code retrieved from the codebase index is not sufficient to determine the entry point, receiving a first evaluation response from the one or more generative AI models indicating a negative entry point response; and if the code retrieved from the codebase index is sufficient to determine the entry point, receiving the first evaluation response from the one or more generative AI models with the entry point.

8. The computer-implemented method of claim 7, wherein the first iterative process includes:

receiving a first instance of the first codebase query from the one or more generative AI models upon providing the one or more generative AI models with a first instance of the first codebase query prompt;

retrieving a first instance of the code from the codebase index using the first instance of the first codebase query;

receiving a first instance of the first evaluation response from the one or more generative AI models indicating the negative entry point response upon providing a first instance of the first evaluation prompt to the one or more generative AI models, the user query, and the first instance of the code;

updating the first codebase query prompt to include the first instance of the first codebase query and the first instance of the code to generate a second instance of the first codebase query prompt;

receiving a second instance of the first codebase query from the one or more generative AI models upon providing the one or more generative AI models with the second instance of the first codebase query prompt;

retrieving a second instance of the code from the codebase index using the second instance of the first codebase query; and receiving a second instance of the first evaluation response from the one or more generative AI models with the entry point for integrating the feature of the codebase upon providing a second instance of the first evaluation prompt, the user query, and the second instance of the code to the one or more generative AI models.

9. The computer-implemented method of claim 8, wherein the first iterative process is scheduled to stop after a predetermined number of iterations when instances of the code from the codebase index in previous iterations are not sufficient to determine the entry point.

10. The computer-implemented method of claim 1, wherein providing the second codebase query prompt to the one or more generative AI models includes:

generating the second codebase query prompt to instruct the one or more generative AI models to generate a second codebase query associated with generating the logical code outline for creating the new code, wherein the logical code outline includes a file path, a reference path, and code generation instructions for one or more files;

providing the user query, the entry point, and the second codebase query prompt to the one or more generative AI models; and receiving a second codebase query response from the one or more generative AI models that includes the second codebase query.

11. The computer-implemented method of claim 10, wherein providing the second evaluation prompt to the one or more generative AI models includes:

generating the second evaluation prompt to instruct the one or more generative AI models to determine whether one or more resources retrieved from the codebase index based on executing the second codebase query is sufficient to generate the logical code outline and to generate the logical code outline if the one or more resources are sufficient;

providing the user query, the one or more resources retrieved from the codebase index, and the second evaluation prompt to the one or more generative AI models;

if the one or more resources retrieved from the codebase index is not sufficient to generate the logical code outline, receiving a second evaluation response from the one or more generative AI models indicating a negative logical code outline response; and if the one or more resources retrieved from the codebase index is sufficient to generate the logical code outline, receiving the second evaluation response from the one or more generative AI models with the logical code outline.

12. The computer-implemented method of claim 11, wherein the second iterative process includes:

receiving a first instance of the second codebase query from the one or more generative AI models upon providing the one or more generative AI models with a first instance of the second codebase query prompt;

retrieving a first instance of the one or more resources from the codebase index using the first instance of the second codebase query;

receiving a first instance of the second evaluation response from the one or more generative AI models indicating the negative logical code outline response upon providing a first instance of the second evaluation prompt to the one or more generative AI models, the user query, and the first instance of the one or more resources;

updating the second codebase query prompt to include the first instance of the second codebase query and the first instance of the one or more resources to generate a second instance of the second codebase query prompt;

receiving a second instance of the second codebase query from the one or more generative AI models upon providing the one or more generative AI models with the second instance of the second codebase query prompt;

retrieving a second instance of the one or more resources from the codebase index using the second instance of the second codebase query; and receiving a second instance of the second evaluation response from the one or more generative AI models with the logical code outline for creating the new code upon providing a second instance of the second evaluation prompt, the user query, and the second instance of the one or more resources to the one or more generative AI models.

13. The computer-implemented method of claim 12, wherein the second iterative process is scheduled to stop after a predetermined number of iterations when instances of the one or more resources from the codebase index in previous iterations are not sufficient to generate the logical code outline.

14. The computer-implemented method of claim 1, wherein providing the third codebase query prompt to the one or more generative AI models includes:

generating the third codebase query prompt to instruct the one or more generative AI models to generate a third codebase query associated with generating the new code;

providing the user query, the entry point, the logical code outline, and the third codebase query prompt to the one or more generative AI models; and receiving a third codebase query response from the one or more generative AI models that includes the third codebase query.

15. The computer-implemented method of claim 14, wherein providing the third evaluation prompt to the one or more generative AI models includes:

generating the third evaluation prompt to instruct the one or more generative AI models to determine whether one or more code snippets retrieved from the codebase index based on executing the third codebase query is sufficient to generate the new code and to generate the new code if the one or more code snippets are sufficient;

providing the user query, the one or more code snippets retrieved from the codebase index, and the third evaluation prompt to the one or more generative AI models;

if the one or more code snippets retrieved from the codebase index is not sufficient to generate the new code, receiving a third evaluation response from the one or more generative AI models indicating a negative new code generation response; and if the one or more code snippets retrieved from the codebase index is sufficient to generate the new code, receiving the third evaluation response from the one or more generative AI models with the new code.

16. The computer-implemented method of claim 15, wherein the third iterative process includes:

receiving a first instance of the third codebase query from the one or more generative AI models upon providing the one or more generative AI models with a first instance of the third codebase query prompt;

retrieving a first instance of the one or more code snippets from the codebase index using the first instance of the third codebase query;

receiving a first instance of the third evaluation response from the one or more generative AI models indicating the negative new code generation response upon providing a first instance of the third evaluation prompt to the one or more generative AI models, the user query, the logical code outline, and the first instance of the one or more code snippets or templates;

updating the third codebase query prompt to include the first instance of the third codebase query and the first instance of the one or more code snippets to generate a second instance of the third codebase query prompt;

receiving a second instance of the third codebase query from the one or more generative AI models upon providing the one or more generative AI models with the second instance of the third codebase query prompt;

retrieving a second instance of the one or more code snippets from the codebase index using the second instance of the third codebase query; and receiving a second instance of the third evaluation response from the one or more generative AI models with the new code upon providing a second instance of the third evaluation prompt, the user query, the logical code outline, and the second instance of the one or more code snippets to the one or more generative AI models.

17. A system comprising:

a processing system; and a computer memory comprising instructions that, when executed by the processing system, cause the system to perform operations of:

identifying a codebase index of a codebase based on receiving a user query requesting to integrate a feature into the codebase;

determining an entry point in the codebase for the feature based on providing a first codebase query prompt to one or more generative AI models and a first evaluation prompt to the one or more generative AI models in a first iterative process;

generating a logical code outline for integrating the feature into the codebase based on providing a second codebase query prompt to the one or more generative AI models and a second evaluation prompt to the one or more generative AI models in a second iterative process;

generating new code for integrating the feature into the codebase based on providing a third codebase query prompt to the one or more generative AI models and a third evaluation prompt to the one or more generative AI models in a third iterative process; and integrating the new code into the codebase at the entry point.

18. The system of claim 17, wherein integrating the new code into the codebase at the entry point includes using the one or more generative AI models to merge the new code with corresponding existing code in the codebase.

19. A computer-implemented method for integrating a codebase feature into an existing codebase using one or more generative artificial intelligence (AI) models, comprising:

identifying a codebase index of a codebase based on receiving a user query requesting to integrate a feature into the codebase;

determining an entry point in the codebase for the feature based on providing a first set of multiple prompts to one or more generative AI models in a first iterative process;

generating a logical code outline for integrating the feature into the codebase based on providing a second set of multiple prompts to the one or more generative AI models in a second iterative process;

generating new code for integrating the feature into the codebase based on providing a third set of multiple prompts to the one or more generative AI models in a third iterative process; and integrating the new code into the codebase at the entry point.

20. The computer-implemented method of claim 19, wherein generating the new code includes generating the new code for multiple files in the codebase in parallel from the logical code outline using the one or more generative AI models.

* * * * *